(12) United States Patent
Hayashi et al.

(10) Patent No.: US 8,600,182 B2
(45) Date of Patent: Dec. 3, 2013

(54) METHOD AND APPARATUS FOR COMPRESSION OF IMAGE DATA BASED ON DISPLAY PARAMETERS

(75) Inventors: Tsuneo Hayashi, Chiba (JP); Shinji Watanabe, Tokyo (JP); Masahito Yamane, Kanagawa (JP); Takeshi Uemori, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/402,309

(22) Filed: Feb. 22, 2012

(65) Prior Publication Data

US 2012/0224778 A1 Sep. 6, 2012

(30) Foreign Application Priority Data

Mar. 4, 2011 (JP) ................. 2011-047797

(51) Int. Cl.
*G06T 7/00* (2006.01)
*G06T 9/00* (2006.01)

(52) U.S. Cl.
USPC ............................ 382/239; 382/128; 382/232

(58) Field of Classification Search
None
See application file for complete search history.

(56) References Cited

U.S. PATENT DOCUMENTS

| 7,146,372 | B2 * | 12/2006 | Bacus et al. ........................ 1/1 |
| 7,260,261 | B2 * | 8/2007 | Xie et al. ....................... 382/173 |
| 7,505,614 | B1 * | 3/2009 | De La Torre-Bueno ...... 382/128 |
| 7,562,056 | B2 * | 7/2009 | Ma et al. ......................... 706/20 |
| 7,792,376 | B2 * | 9/2010 | Mizuno ........................ 382/240 |
| 7,929,793 | B2 * | 4/2011 | Gering et al. ................. 382/239 |
| 8,041,129 | B2 * | 10/2011 | Ernvik et al. ................. 382/232 |
| 8,086,077 | B2 * | 12/2011 | Eichhorn ..................... 382/305 |
| 2010/0091330 | A1 * | 4/2010 | Marchesotti et al. ........ 358/1.18 |
| 2010/0215098 | A1 * | 8/2010 | Chung .................... 375/240.08 |
| 2011/0243405 | A1 * | 10/2011 | Ohashi ........................ 382/128 |

FOREIGN PATENT DOCUMENTS

| JP | 2005-288157 A | 10/2005 |
| JP | 2010-061678 A | 3/2010 |

OTHER PUBLICATIONS

Bruckmann et al, "Selective Medical Image Compression Techniques for Telemedical and Archiving Applications" 2000.*
Xie et al, "Learning User Interest for Image Browsing on Small-form-factor Devices" 2005.*
Roa-Pena et al, "An Experimental Study of Pathologist's Navigation Patterns in Virtual Microscopy" 2010.*

* cited by examiner

*Primary Examiner* — Anand Bhatnagar
*Assistant Examiner* — Alexander J Lesnick
(74) *Attorney, Agent, or Firm* — Wolf, Greenfield & Sacks, P.C.

(57) ABSTRACT

An information processing apparatus includes a display time acquiring unit that acquires a display time for each predetermined unit region of an image and a compression control unit that controls compression of the image for each unit region based on the display time.

14 Claims, 18 Drawing Sheets

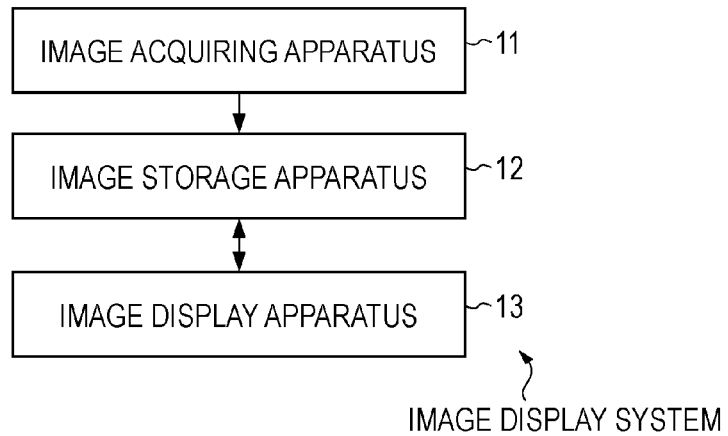
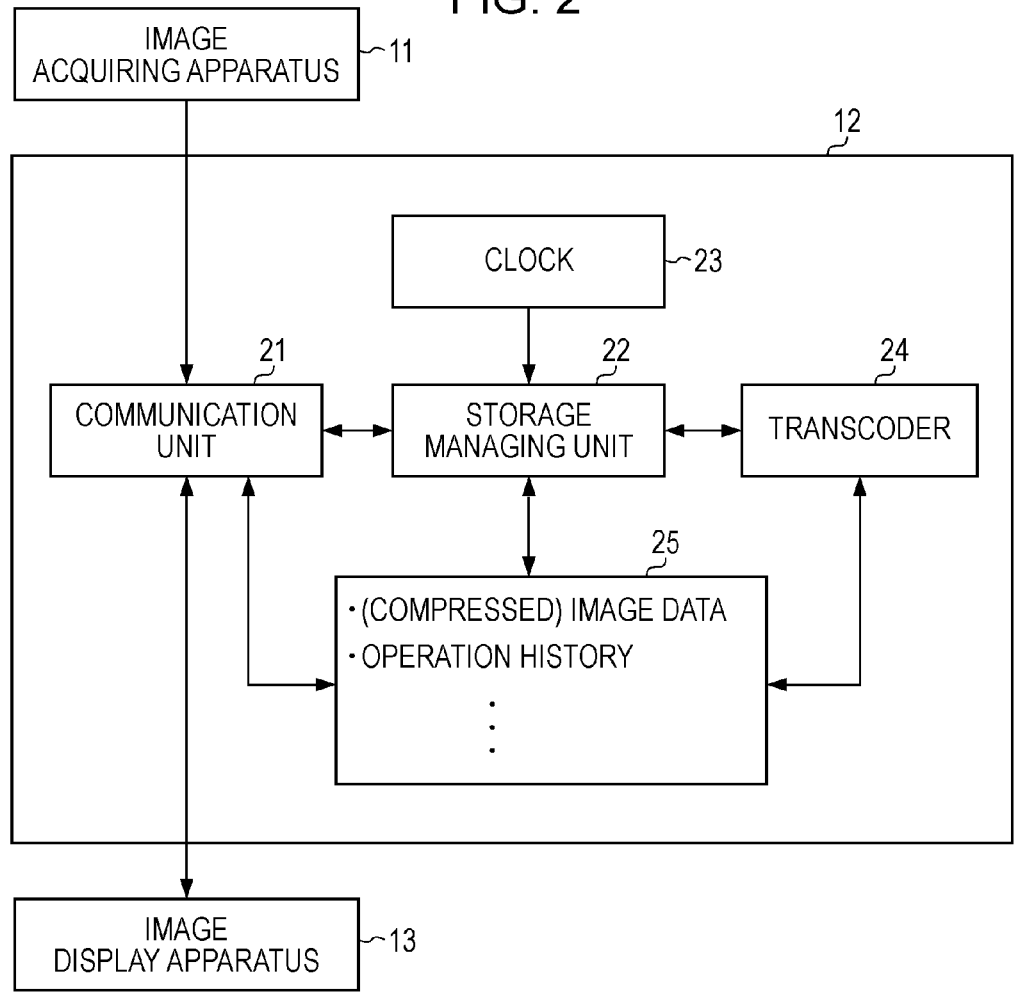

FIG. 5

| | |
|---|---|
| OPERATION HISTORY | |
| 1 | $X_1, Y_1, Z_1, S_1, T_1$ (INITIAL VALUE) |
| 2 | $\Delta X_2, \Delta Y_2, \Delta Z_2, \Delta T_2$ |
| 3 | $\Delta S_3, \Delta T_3$ |
| 4 | $\Delta S_4, \Delta T_4$ |
| 5 | $\Delta S_5, \Delta T_5$ |
| 6 | $\Delta X_6, \Delta Y_6, \Delta T_6$ |
| 7 | $\Delta X_7, \Delta Y_7, \Delta T_7$ |
| 8 | MARK, $\Delta T_8$ |
| 9 | $\Delta X_9, \Delta Y_9, \Delta T_9$ |

...

| | |
|---|---|
| N-1 | $\Delta X_{N-1}, \Delta Y_{N-1}, \Delta Z_{N-1}, \Delta S_{N-1}, \Delta T_{N-1}$ |
| N | $X_1, Y_1, Z_1, S_1, T_1$ (INITIAL VALUE) |
| N+1 | $\Delta X_2, \Delta Y_2, \Delta Z_2, \Delta S_2, \Delta T_2$ |
| N+2 | $\Delta X_3, \Delta Y_3, \Delta Z_3, \Delta S_3, \Delta T_3$ |
| N+3 | $\Delta X_4, \Delta Y_4, \Delta Z_4, \Delta S_4, \Delta T_4$ |
| N+4 | $\Delta X_5, \Delta Y_5, \Delta Z_5, \Delta S_5, \Delta T_5$ |

...

METHOD AND APPARATUS FOR COMPRESSION OF IMAGE DATA BASED ON DISPLAY PARAMETERS

BACKGROUND

The present technology relates to an information processing apparatus, an information processing method, and a program, and more particularly, to an information processing apparatus, an information processing method, and a program capable of reducing the data amount of an image while suppressing deterioration in the image quality of a portion of an image which a user is interested in.

In recent years, a virtual slide system has been suggested as a method of executing pathological diagnoses efficiently and quickly (for example, see Japanese Unexamined Patent Application Publication No. 2010-061678).

In the virtual slide system, images obtained by photographing samples of pathological tissues with a microscope are stored in a storage and the images are read from the storage and are displayed on a monitor, as necessary. Pathologists (doctors who give pathological diagnoses) browse (view) the images displayed on the monitor and give pathological diagnoses.

However, since the field of view of the microscope is narrow, a sample of a pathological tissue is photographed with the microscope, being shifted little by little. Therefore, the image of one sample has billion pixels to ten billion pixels.

Accordingly, since the data amount of a sample image is massive, it is necessary to provide a method of appropriately reducing the data amount.

As the method of reducing the data amount of the sample images, there is a method of evaluating the image qualities of images compressed at respective compression ratios and compressing the images at appropriate compression ratios based on the evaluation result (for example, see Japanese Unexamined Patent Application Publication No. 2005-288157).

SUMMARY

In the method disclosed in Japanese Unexamined Patent Application Publication No. 2005-288157, the images can be compressed at the appropriate compression ratios based on the evaluation result of the user.

In the method disclosed in Japanese Unexamined Patent Application Publication No. 2005-288157, however, not only the user browses the images but also the user has to execute an operation (as an action different from the browsing of the images) of evaluating the image qualities of the images compressed at each compression ratio and inputting the evaluation result.

The above-described action different from the browsing of the images may not be executed by the user. When the data amount of images can be reduced while suppressing the deterioration in the image qualities of portions which the user is highly interested in, it is possible to improve the convenience of the user.

It is desirable to provide a technique of easily reducing the data amount of an image while suppressing a deterioration in the image quality of a portion of the image which a user is highly interested in.

According to an embodiment of the present technology, there is provided an information processing apparatus that includes a display time acquiring unit that acquires a display time for each predetermined unit region of an image or a program causing a computer to serve as the information processing apparatus; and a compression control unit that controls compression of the image for each unit region based on the display time.

According to another embodiment of the present technology, there is provided an information processing method including: acquiring a display time for each predetermined unit region of an image; and controlling compression of the image for each unit region based on the display time.

According to the embodiments of the present technology, the display time is acquired for each predetermined unit region of the image and the compression of the image is controlled for the unit region based on the display time.

The information processing apparatus may be an independent apparatus or an internal block of a single apparatus.

The program may be transmitted via a transmission medium or may be recorded in a recording medium to supply the program.

According to the embodiments of the present technology, it is possible to easily reduce the data amount of an image while suppressing a deterioration in the image quality of a portion of the image which a user is highly interested in.

BRIEF DESCRIPTION OF THE DRAWINGS

FIG. 1 is a block diagram illustrating an example of the configuration of an image display system, to which an information processing apparatus of the present technology is applied, according to a first embodiment of the present technology;

FIG. 2 is a block diagram illustrating an example of the configuration of an image storage unit;

FIG. 5 is a diagram illustrating an example of an operation history;

DETAILED DESCRIPTION OF EMBODIMENTS

Figure 3:
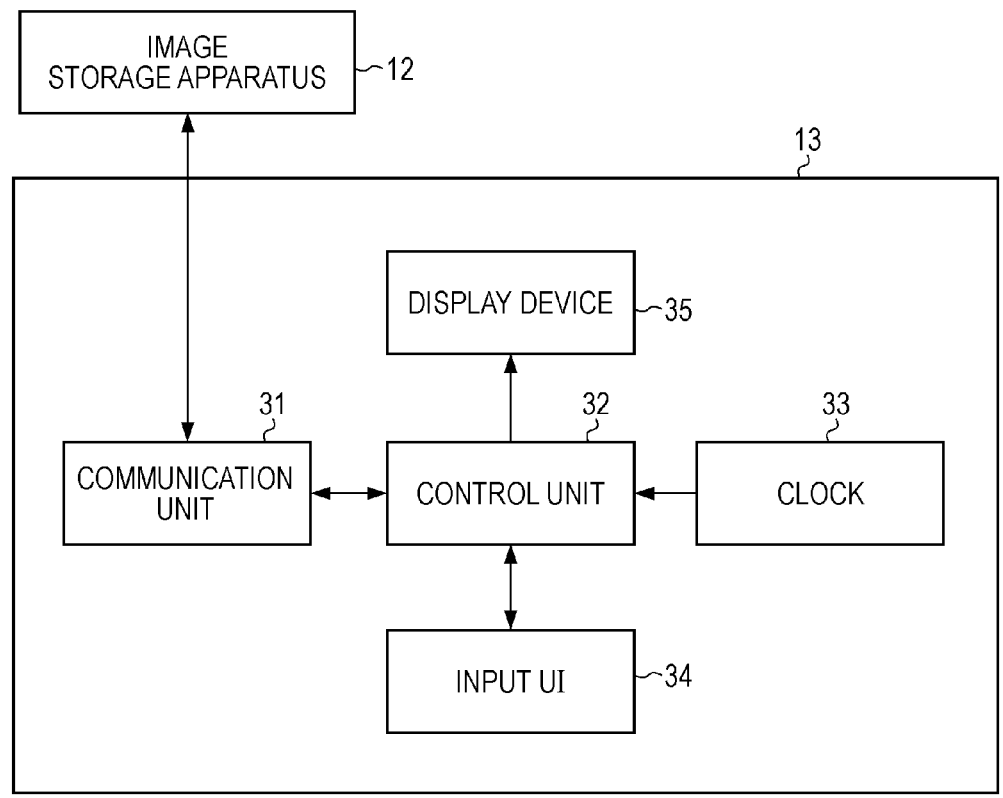
FIG. 3 is a block diagram illustrating an example of the configuration of an image display apparatus.

Image Display System according to First Embodiment of the Present Technology

FIG. 1 is a block diagram illustrating an example of the configuration of an image display system (which refers to a logical collection of a plurality of apparatuses which may be provided or may not be provided in the same casing), to which an image processing apparatus of the present technology is applied, according to a first embodiment of the present technology.

In FIG. 1, the image display system includes an image acquiring apparatus 11, an image storage apparatus 12, and an image display apparatus 13.

The image acquiring apparatus 11, the image storage apparatus 12, and the image display apparatus 13 may be configured as separate apparatuses or may be configured as a single apparatus accommodated in a single casing.

The image acquiring apparatus 11 acquires images and supplies the images to the image storage apparatus 12.

Here, the image display system is applicable to, for example, a virtual slide system.

When the image display system is applied to the virtual slide system, the image acquiring apparatus 11 includes, for example, a microscope and a camera that images a sample of a pathological tissue with the microscope. When the camera images the sample of the pathological tissue with the microscope, the images (digital data of the images) obtained as the photographing result are supplied to the image storage apparatus 12. Here, the image acquiring apparatus 11 can set a focus position at a plurality of different positions to acquire the images. Further, the image acquiring apparatus 11 can acquire the images by shifting the photographing position in a horizontal direction to a plurality of different positions.

A multi-lens camera can be used as the camera of the image acquiring apparatus 11.

The image storage apparatus 12 stores (records) the images of samples of pathological tissues or the like from the image acquiring apparatus 11 and supplies (provides) the images to the image display apparatus 13 in response to a request from the image display apparatus 13.

For example, the image display apparatus 13 displays the images supplied from the image storage apparatus 12 in response to an operation of a user such as a pathologist.

In the image display system with the above-described configuration, the image acquiring apparatus 11 acquires the images and supplies the images to the image storage apparatus 12. The image storage apparatus 12 stores the images from the image acquiring apparatus 11.

On the other hand, the image display apparatus 13 gives a request for supplying the images to the image storage unit 12 in response to an operation of the user.

The image storage apparatus 12 supplies the images to the image display apparatus 13 in response to the request from the image display apparatus 13 and the image display apparatus 13 displays the images supplied from the image storage apparatus 12.

Example of Configuration of Image Storage Apparatus 12

FIG. 2 is a block diagram illustrating an example of the configuration of the image storage apparatus 12 in FIG. 1.

The image storage apparatus 12 includes a communication unit 21, a storage managing unit 22, a clock 23, a transcoder 24, and a storage 25.

The communication unit 21 is a communication interface such as an NIC (Network Interface Card) and controls exchange of data with the image acquiring apparatus 11 or the image display apparatus 13.

That is, for example, the communication unit 21 receives the images supplied (transmitted) from the image acquiring apparatus 11 and supplies the images to the storage 25.

For example, the communication unit 21 supplies (transmits) the images, which the storage managing unit 22 reads from the storage 25 to supply the images to the communication unit 21, to the image display apparatus 13 in response to the request from the image display apparatus 13.

Further, for example, the communication unit 21 receives operation data, which indicates an operation of the user on the image display apparatus 13 and is supplied from the image display apparatus 13, and supplies the operation data to the storage managing unit 22.

The storage managing unit 22 manages the storage (record) of the images or the like stored in the storage 25.

That is, for example, the storage managing unit 22 generates an operation history regarding operations of the user on the image display apparatus 13 from the operation data supplied from the communication unit 21, and then supplies the operation history to the storage 25 to store the operation history.

The storage managing unit 22 acquires a display time for each predetermined unit region of an image stored in the storage 25 based on the operation history stored in the storage 25 and generates a display time map, which is a map of the display time of each unit region, for the images stored in the storage 25.

Further, the storage managing unit 22 controls the transcoder 24 such that the transcoder 24 compresses the image stored in the storage 25 for each unit region based on the display time of the display time map.

The clock 23 measures a time and supplies the time to the storage managing unit 22.

Here, the storage managing unit 22 recognizes a time (elapsed time) elapsed after the user browses the image stored in the storage 25 with reference to the time supplied from the clock 23. Then, when the elapsed time becomes, for example, a predetermined time (hereinafter, also referred to as a set time), that is, when the user browses the image stored in the storage 25 and the set time is elapsed, the storage managing unit 22 controls the transcoder 24 such that the transcoder 24 compresses the image stored in the storage 25.

Accordingly, for example, when 3 months, 3 years, and 7 years are set as the set time, the images stored in the storage 25 are browsed by the user, and then are compressed (recompressed) when 3 months are elapsed, 3 years are elapsed, and 7 years are elapsed.

The transcoder 24 compresses (trans-codes) the images stored in the storage 25 under the control of the storage managing unit 22, supplies the compressed images to the storage 25, and stores the compressed images instead of the images immediately before the compression.

Here, a compression (encoding) scheme, such as JPEG 2000, of using quantization can be used as the compression scheme of the transcoder 24.

The storage 25 is configured by, for example, an HDD (Hard Disk Drive) or an SSD (Solid State Drive). The storage 25 stores the images from the communication unit 21 or the transcoder 24 or stores the operation history or the like from the storage managing unit 22.

In the image storage apparatus 12 with the above-described configuration, the communication unit 21 receives the images supplied from the image acquiring apparatus 11 and supplies the images to the storage 25 to store the images.

When an image request is given from the image display apparatus 13, the communication unit 21 supplies the image request to the storage managing unit 22.

The storage managing unit 22 supplies the image to the image display apparatus 13 by reading the asked image from the storage 25 in response to the image request from the communication unit 21 and supplying the image to the communication unit 21.

The communication unit 21 receives the operation data indicating an operation of the user on the image display apparatus 13 from the image display apparatus 13, and then supplies the operation data to the storage managing unit 22.

The storage managing unit 22 generates the operation history of the operations of the user on the image display apparatus 13 based on the operation data from the communication unit 21, and then supplies the operation history to the storage 25 to store the operation history.

The storage managing unit 22 generates the display time map, in which the display time of each unit region of the image stored in the storage 25 is registered, based on the operation history stored in the storage 25.

When the elapsed time becomes the predetermined set time with reference to the time from the clock 23 after the user browses the image stored in the storage 25, the storage managing unit 22 controls the transcoder 24 such that the transcoder 24 compresses the image (the image for which the elapsed time becomes the set time) stored in the storage 25 for each unit region based on the display time of the display time map.

The transcoder 24 compresses (recompresses) the image stored in the storage 25 under the control of the storage managing unit 22. Then, the transcoder 24 supplies the compressed image to the storage 25 and stores the compressed image instead of the image immediately before the compression.

Hereinafter, in order to facilitate the description, it is assumed that the storage of the image storage apparatus 12 stores one image (for example, an image obtained by photographing one sample).

Example of Configuration of Image Display Apparatus 13

FIG. 3 is a block diagram illustrating an example of the configuration of the image display apparatus 13 in FIG. 1.

The image display apparatus 13 includes a communication unit 31, a control unit 32, a clock 33, an input UI (User Interface) 34, and a display device 35.

The communication unit 31 is the same communication interface as the communication unit 21 in FIG. 2 and controls exchange of data with the image storage apparatus 12.

That is, for example, the communication unit 31 receives the image supplied (transmitted) from the image storage apparatus 12 and supplies the image to the control unit 32.

For example, the communication unit 31 supplies (transmits) of the operation data supplied from the control unit 32 to the image storage apparatus 12.

The control unit 32 executes various processes in response to the operations of the user on the input UI 34.

That is, the control unit 32 gives a request for supplying the image to the image storage apparatus 12 via the communication unit 31 in response to the operation of the user on the input UI 34. Further, the control unit 32 receives the image from the image storage apparatus 12 via the communication unit 31 and executes a control such that the image is displayed on the display device 35.

The control unit 32 generates the operation data indicating the operation of the user on the unit UI 34 and transmits the operation data to the image storage apparatus 12 via the communication unit 31.

The clock 33 measures a time and supplies the time to the control unit 32.

Here, the control unit 32 recognizes the time at which the input UI 34 is operated with reference to the time from the clock 33 and allows this time to be included in the operation data.

The input UI 34 is a user interface that receives an input from the user. An operation member, such as a mouse, a keyboard, a joystick, a foot button, or a game controller, physically operated by the user can be used as the input UI 34.

Not only the operation member physically operated by the user but also a member capable of recognizing a gesture, a glance, a brain wave, or a voice of the user can be used as the input UI 34.

The display device 35 is configured by, for example, a liquid crystal panel or an organic EL (Electro Luminance) panel. The display device 35 displays the image under the control of the control unit 32.

The number of pixels of the image acquired by the image acquiring apparatus 11 is generally larger than the resolution of the display device 35 of the image display apparatus 13. Therefore, an image which can be displayed at a time on the image display apparatus 13 is a part of the image acquired by the image acquiring apparatus 11. The user can operate the input UI 34 to execute selection of an image displayed on the image display apparatus 13, scrolling, display magnification adjustment, and focus position adjustment. Further, the user can operate the input UI 34 to give a mark to a point of interest.

In the image display apparatus 13 with the above-described configuration, when the user operates the input UI 34 to display an image, the control unit 32 gives an image request for supplying the image to the image storage apparatus 12 via the communication unit 31 in response to the operation of the user on the input UI 34.

Further, the control unit 32 receives the image supplied from the image storage apparatus 12 via the communication unit 31 in response to the image request (and decompresses the image, as necessary) and displays the image on the display device 35.

A region (range) displayed on a display screen of the display device 35 in the image stored in the image storage apparatus 12 can be changed by operating the input UI 34.

That is, in the image stored in the image storage apparatus 12, the region displayed on the display screen of the display device 35 is assumed to be a display region. Then, the control unit 32 changes the display region in response to the operation of the input UI 34.

When the display region is changed, the position of the display region is changed and the scale (size) of the display region is changed.

When the position of the display region is changed, the display region on the image stored in the image storage apparatus 12 is moved. When the scale of the display region is changed, the size of the display region on the image stored in the image storage apparatus 12 is increased or decreased.

When the size of the display region is increased in the image display apparatus 13, the image in the display region is reduced and displayed. When the size of the display region is decreased, the image in the display region is expanded and displayed.

When the input UI 34 is operated, the control unit 32 generates the operation data indicating the operation of the input UI 34, allows the time from the clock 33 to be included in the operation data, and transmits the operation data to the image storage apparatus 12 via the communication unit 31.

Here, the operation data includes not only the time from the clock 33, that is, a time T at which the input UI 34 is operated, and the coordinates (X, Y, Z) and the scale S of the position of the display region subjected to the operation of the input UI 34 on the image (hereinafter, also referred to as a stored image) stored in the image storage apparatus 12.

Among the coordinates (X, Y, Z), the x coordinate X represents the coordinate of the axis (x axis) of the stored image in the horizontal (x) direction and the y coordinate Y represents the coordinate of the axis (y axis) of the stored image in the vertical (y) direction.

Among the coordinates (X, Y, Z), the z coordinate Z represents the coordinate in a layer direction when the stored images are an image of a plurality of layers.

That is, when the image acquiring apparatus 11 images a sample of a pathological tissue being observed with the microscope, the sample of the pathological tissue is focused at a plurality of focus positions with the microscope and the sample of the pathological tissue observed at the respective focus positions is photographed.

In this case, the images of the sample of the pathological tissue can be obtained at the plurality of focus positions. In this case, the plurality of images at the plurality of focus positions are the images of the plurality of layers.

When the stored images are the images of the plurality of layers, the stored images can be conceptually comprehended as images configured such that the images of the respective layers spreading in the xy directions are lined at the positions corresponding to the focus positions in the z direction.

In the case where the stored images are the images of the plurality of layers, the transcoder 24 of the image storage apparatus 12 (see FIG. 2) compresses the images of the respective layers as 2D compressed images, when the stored images are supplied from the image acquiring apparatus 11. Therefore, after the user browses the stored images and the set time is elapsed, the images of all the layers can be converted into 3D compressed images.

Among the coordinates (X, Y, Z) of the position of the display region subjected to the operation of the input UI 34, the x coordinate and the y coordinate of the right upper position, the center (centroid) position, or the like of the display region can be used as the x coordinate X and the y coordinate Y.

Further, the user can execute, as the operation of the input UI 34, not only the operation of changing the display region but also a mark operation of giving a mark (applying a mark) to the image in the display region.

When the user executes the mark operation, the operation data can include mark information indicating that the mark operation is executed.

Example of Configuration of Storage Managing Unit 22

Figure 4:
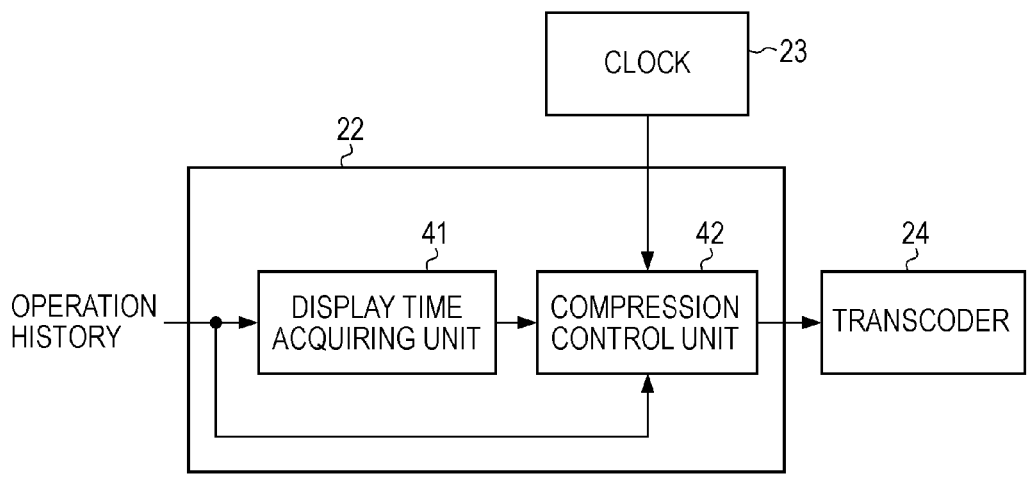
FIG. 4 is a block diagram illustrating an example of the configuration of a storage managing unit.

FIG. 4 is a block diagram illustrating an example of the configuration of the units controlling the compression of the image by the transcoder 24 of the storage managing unit 22 in FIG. 2.

In FIG. 4, the storage managing unit 22 includes a display time acquiring unit 41 and a compression control unit 42.

The display time acquiring unit 41 acquires the display time for each predetermined region of the stored image, generates the display time map in which the display time for each unit region is registered, and supplies the display time map to the compression control unit 42.

That is, for example, the display time acquiring unit 41 calculates the display time for each unit region of the stored image based on the operation history generated when the user browses the stored images stored in the storage 25 (see FIG. 2), generates the display time map which is a map of the display time of each unit region, and supplies the display time map to the compression control unit 42.

The compression control unit 42 controls the compression of the stored image for each unit region based on the display time map from the display time acquiring unit 41.

That is, the compression control unit 42 determines whether the elapsed time becomes a predetermined set time after the user browses the stored image with reference to the time from the clock 23.

When the elapsed time becomes the predetermined set time after the user browses the stored image, the compression control unit 42 controls the transcoder 24 such that the transcoder 24 compresses the stored image stored in the storage 25 for each unit region based on the display time of the display time map from the display time acquiring unit 41.

Further, the compression control unit 42 controls the transcoder 24 such that the transcoder 24 compresses the stored image also based on the mark information included in the operation history (the operation data of the operation history) as well as the display time map from the display time acquiring unit 41.

Example of Operation History

FIG. 5 is a diagram illustrating an example of the operation history stored in the storage 25 (see FIG. 2).

When the user operates the input UI 34 of the image display apparatus 13 (see FIG. 3) to browse the stored image and the stored image starts to be displayed on the image display apparatus 13, the control unit 32 of the image display apparatus 13 generates the operation data including the coordinates (X, Y, Z) and the scale S of the display region (the region of the stored image displayed on the image display apparatus 13) after the operation of the input UI 34 and the time (operation time) T when the input UI 34 is operated and transmits the operation data to the image storage apparatus 12 via the communication unit 31.

The storage managing unit 22 of the image storage apparatus 12 (see FIG. 2) receives the operation data from the image display apparatus 13 via the communication unit 21 and stores the first operation data after the display start of the stored image as the operation history without change in the storage 25.

Thereafter, whenever the user operates the input UI 34, the image display apparatus 13 generates the operation data and transmits the operation data to the image storage apparatus 12.

In order to store the operation data subsequent to the second operation data after the display start of the stored image, the storage managing unit 22 of the image storage apparatus 12 calculates difference information corresponding to a difference between the operation data and the immediately previous operation data and stores the difference information as the operation history in the storage 25.

That is, on the assumption that the coordinates (X, Y, Z), the scale S, and the operation time T included in n-th operation data after the display start of the stored image are expressed as $[X_n, Y_n, Z_n, S_n, T_n]$, the storage managing unit 22 stores the first operation data $[X_1, Y_1, Z_1, S_1, T_1]$ as the operation history without change in the storage 25.

In order to store the n-th operation data $[X_n, Y_n, Z_n, S_n, T_n]$, the storage managing unit 22 calculates difference information $[\Delta X_n, \Delta Y_n, \Delta Z_n, \Delta S_n, \Delta T_n]$ corresponding to a difference (difference between respective components) between the operation data $[X_n, Y_n, Z_n, S_n, T_n]$ and the n-1-th operation data $[X_{n-1}, Y_{n-1}, Z_{n-1}, S_{n-1}, T_{n-1}]$ and stores the difference information $[\Delta X_n, \Delta Y_n, \Delta Z_n, \Delta S_n, \Delta T_n]$ as the operation history in the storage 25.

Here, as the operation history, only the components with the values other than 0 can be stored among the components $\Delta X_n, \Delta Y_n, \Delta Z_n, \Delta S_n,$ and $\Delta T_n$ of the difference information $[\Delta X_n, \Delta Y_n, \Delta Z_n, \Delta S_n, \Delta T_n]$.

In the operation history shown in FIG. 5, only the components with the values other than 0 are stored.

Further, when the user starts to display the stored image, pauses the display, and then resumes the display of the stored image, the image storage apparatus 12 treats the operation data immediately after the resuming of the display as the first operation data.

In FIG. 5, the display of the stored image is paused and is then resumed between the N-1-th operation history and the N-th operation history.

In FIG. 5, Mark included in the eighth operation history is mark information indicating that the mark operation is executed.

According to the mark information Mark included in the eighth operation history, the execution of the mark operation can be recognized, when the region on the stored image specified by the coordinates $(X_1+\Delta X_2+\Delta X_3+\Delta X_4+\Delta X_5+\Delta X_6+\Delta X_7+\Delta X_8, Y_1+\Delta Y_2+\Delta Y_3+\Delta Y_4+\Delta Y_5+\Delta Y_6+\Delta Y_7+\Delta Y_8, Z_1+\Delta Z_2+\Delta Z_3+\Delta Z_4+\Delta Z_5+\Delta Z_6+\Delta Z_7+\Delta Z_8)$ and the scale $S_1+\Delta S_2+\Delta S_3+\Delta S_4+\Delta S_5+\Delta S_6+\Delta S_7+\Delta S_8$.

Accordingly, the display region displayed when the user executes the mark operation can be recognized based on the operation history.

According to the operation history, the region on the stored image displayed as the display region and the display time of the display region can be recognized.

That is, for example, from the first operation history and the second operation history, it can be recognized that the region specified by the coordinates $(X_1+\Delta X_2, Y_1+\Delta Y_2, Z_1+\Delta Z_2)$ and the sale $S_1$ is displayed as the display region. Further, from the third operation history, it can be recognized that the display time of the display region is a time $\Delta T_3$.

The display time acquiring unit 41 of the storage managing unit 22 (see FIG. 4) recognizes the display region which is the region of the stored image displayed on the image display apparatus 13 and the display time of the display region.

Further, the display time acquiring unit 41 calculates the display time of the unit region for each unit region of the stored image by integrating the display times of the display regions for the unit region included in the display region.

That is, the display time acquiring unit 41 partitions the stored image into regions, which is the unit region, with a predetermined size and calculates the display time for each unit region by integrating the display times of the unit regions including the unit region for each unit region.

Specifically, for example, when a given unit region r is included in a given display region R1 and is also included in another display region R2, the display time of the unit region r is a time obtained by adding the display time of the display region R1 and the display time of the display region R2.

The unit region of which a part is included in the display region is considered to be included in the display region.

The fact that a region with a certain size is used as the unit region is set in advance.

As the unit region, an arbitrary region, such as a region with the horizontal and vertical sizes of 256×256 pixels or a region with the horizontal and vertical sizes of 1024×1024 pixels, can be used. The minimum unit region is a region with the horizontal and vertical sizes of 1×1 pixel, that is, one pixel.

Process of Storage Managing Unit 22

Figure 6:
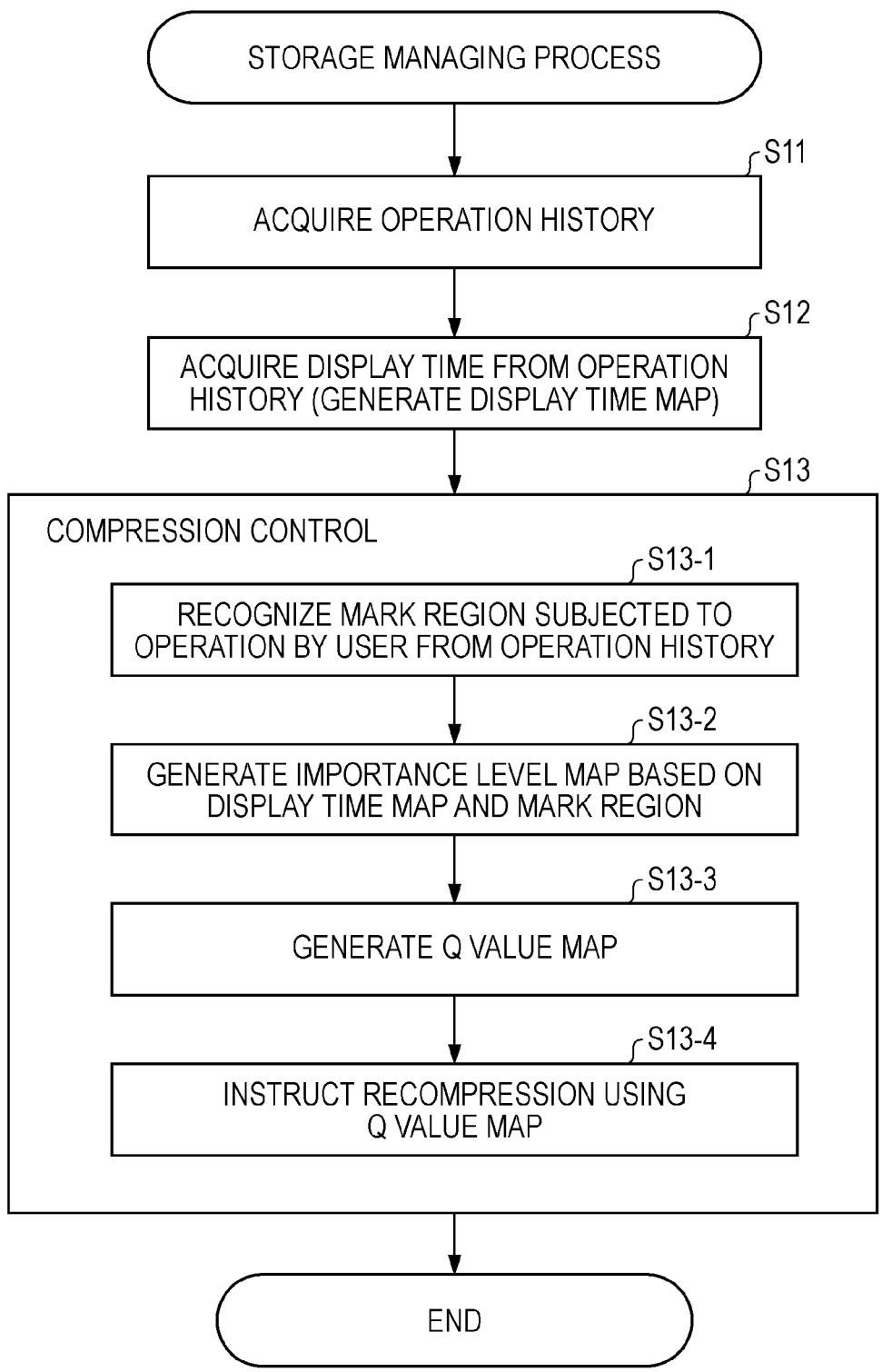
FIG. 6 is a flowchart illustrating a storage managing process.

FIG. 6 is a flowchart illustrating a process (storage managing process) of the storage managing unit 22 shown in FIG. 4.

For example, the storage managing unit 22 starts the storage managing process, when the elapsed time becomes the predetermined set time after the user browses the stored image, that is, the elapsed time becomes the predetermined set time after the stored image is displayed on the image display apparatus 13.

In the storage managing process, in step S11, the display time acquiring unit 41 of the storage managing unit 22 acquires the operation history from the storage 25 (see FIG. 2) by reading the operation history generated when the user browses the stored image. Then, the storage managing process proceeds to step S12.

In step S12, the display time acquiring unit 41 calculates the display time for each unit region of the stored image based on the operation history generated when the user browses the stored image, as described with reference to FIG. 5, and generates the display time map which is the map of the display time for each unit region.

The display time acquiring unit 41 supplies the display time map to the compression control unit 42. Then, the storage managing process proceeds from step S12 to step S13.

In step S13, the compression control unit 42 executes the compression control of controlling the compression of the stored image for each unit region based on the display time map from the display time acquiring unit 41.

Here, the image in the unit region in which the display time is long in the display time map is estimated to be a portion, which the user is highly interested in, in the stored image.

Thus, in the compression control of step S13, the compression control unit 42 controls the compression of the stored image such that a compression ratio is lowered in the unit region in which the display time is longer.

In this embodiment, the compression ratio indicates a ratio of the amount of data compressed through the compression control to the amount of data not compressed through the compression control. On the assumption that D is the amount of data not compressed through the compression control and D' is the amount of data compressed through the compression control, the compression ratio is expressed as D'/D×100%. The fact that the "value" of the compression ratio is large means that the compression ratio is low (low compression). The fact that the "value" of the compression ratio is small means that the compression ratio is high (high compression).

In step S13-1 of the compression control of step S13, as described with reference to FIG. 5, the compression control unit 42 recognizes the display region which the region on the stored image, which is displayed when the mark operation is executed, based on the operation history generated when the user browses the stored image stored in the storage 25 (see FIG. 2). Then, the process proceeds to step S13-2.

Here, the unit region included in the display region on the stored image displayed when the mark operation is executed is also referred to as a mark region.

The user executes the mark operation on the image of the unit region which is the mark region, when the image is displayed. Therefore, like the unit region in which the display time is long, the image of the unit region is estimated to be a portion, which the user is highly interested in, in the stored image.

In step S13-2, the compression control unit 42 generates an importance level map based on the display time map and the mark region which is the unit region included in the display region on the stored image displayed when the mark operation is executed.

Here, the importance level map is a map in which an importance level indicating the importance of the unit region (the image of the unit region) is registered. The compression control unit 42 calculates the importance level of each unit region of the stored image based on the display time map and the mark region and generates the importance level map in which the importance level is registered.

A method of calculating the importance level will be described in detail below. Roughly speaking, since the importance of the unit region is larger as the user is highly interested in the image of the unit region, the larger importance level is calculated.

Accordingly, the higher importance level is calculated in the unit region in which the display time is longer. Further, when the unit region is the mark region, the high importance level (than the unit region other than the mark region) is calculated in the unit region which is the mark region.

Further, the importance level map may be generated based on only the display time map.

The importance level of the unit region is registered for each unit region of the stored image in the importance level map, as described above. Therefore, in the importance level map, the importance level of the unit region including the coordinates can be obtained when the coordinates on the stored image are given.

When the importance map is generated in step S13-2, the compression control unit 42 controls the compression of the stored image based on the importance level map.

That is, when the importance level map is generated in step S13-2, the process proceeds to step S13-3 and the compression control unit 42 generates the Q value map based on the importance level map.

Here, the Q value map is a map in which the quantization step (Q value) used for the quantization in the compression method, which is executed by the transcoder 24 (see FIG. 2), of using the quantization is registered for each unit region.

A method of generating the Q value map, that is, a method of obtaining the quantization step of the Q value map will be described in detail below. Roughly speaking, the small quantization step is obtained in the unit region in which the importance level is high. The large quantization step is obtained in the unit region in which the importance level is low.

Thereafter, the process proceeds from step S13-3 to step S13-4 and the compression control unit 42 gives a recompression instruction to the transcoder 24 by using the Q value map and terminates the storage managing process.

Process of Transcoder 24

Figure 7:
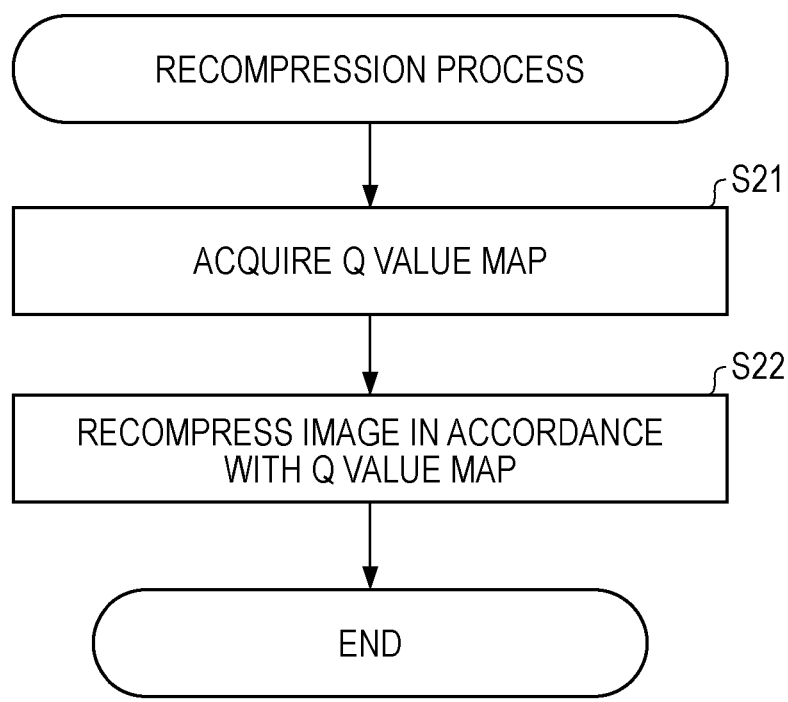
FIG. 7 is a flowchart illustrating a compressing process.

FIG. 7 is a flowchart illustrating a recompression process executed by the transcoder 24 in FIG. 2 under the control of the compression control unit 42 of the storage managing unit 22 (see FIG. 4).

The transcoder 24 waits the instruction of the recompression executed using the Q value map, as described with reference to FIG. 6, from the compression control unit 42 of the storage managing unit 22 (see FIG. 4) and starts the compression process.

In the compression process, the transcoder 24 acquires the Q value map from the compression control unit 42 in step S21, and the process proceeds to step S22.

In step S22, the transcoder 24 compresses (recompresses) the stored image stored in the storage 25 in accordance with the Q value map from the compression control unit 42.

That is, the transcoder 24 compresses the stored image by the compression scheme of using the quantization such as JPEG 2000. However, in the quantization, the quantization step registered in the Q value map is used.

Accordingly, in the method of recompressing the stored image, the stored image is quantized for each unit region in the quantization step registered in the Q value map.

When the compression (recompression) of the stored image is completed in step S22, the transcoder 24 supplies the compressed stored image to the storage 25 and stores the compressed stored image instead of the image immediately before the compression. Then, the compression process ends.

Here, the compression ratio of the compression in which the quantization step is executed in a small quantization step is low and the compression ratio of the compression in which the quantization step is executed in a large quantization step is high.

On the other hand, in the compression control executed by the compression control unit 42, as described with reference to FIG. 6, the small quantization step is obtained in the unit region in which the importance level is high.

Accordingly, unit region in which the importance level is high, that is, the unit region in which the display time is long or the unit region which is the mark region is compressed at a low compression ratio. The unit region in which the importance level is low, that is, the unit region in which the display time is not long and which is not the unit region is compressed at a high compression ratio.

As described above, the unit region in which the display time is long is compressed at a low compression ratio and the unit region in which the display time is not long is compressed at a high compression ratio. Therefore, it is possible to easily reduce the data amount of stored image while suppressing a deterioration in the image quality of a portion which a user is highly interested in.

That is, it is possible to reduce the data amount of stored image, while suppressing the deterioration in the image quality of the portion, which the user is highly interested in, in the unit region in which the display time is long, that is, the unit region in which the user's browsing time is long, even when the user does not execute, for example, a mark operation as an action different from the browsing of the stored image. As a consequence, the convenience of the user can be improved.

In FIG. 6, the compression control unit 42 controls the quantization step (Q value) as one of the parameters of the compression performed by the transcoder 24. However, the compression control unit 42 may control the compression of the stored image, so that the compression ratio is lower in the unit region in which the importance level is higher (so that the compression ratio is high in the unit region in which the importance level is lower), by controlling the parameter of the compression affecting the compression ratio, except for the quantization step, based on the importance level.

Further, the compression control unit 42 may control the compression of the stored image, so that the compression ratio is lower in the unit region in which the importance level is higher, by using a plurality of compression schemes (codecs) of different compression ratios as the compression scheme of the transcoder 24 and controlling the compression scheme of using each unit region in the compression based on the importance level.

Further, the compression control unit 42 can determine whether the image is an image to be deleted in the unit of the unit region based on the importance level by controlling the compression of the stored image.

That is, the compression control unit 42 can control the compression of the stored image such that the unit region in which the importance level is equal to or greater than a threshold value is not deleted and the unit region in which the importance level is less than the threshold value is deleted.

The fact that the unit region is not deleted means that the unit region is compressed at a compression ratio of 100% (the minimum compression ratio) by the transcoder 24. The fact that the unit region is deleted means that the unit region is compressed at a compression of 0% (the maximum compression ratio) by the transcoder 24.

Further, the compression control unit 42 can control the compression of the stored image by designating the image format for compression executed by the transcoder 24.

For example, YUV444, YUV422, or YUV420 can be used as the image format of the compression executed by the transcoder 24. In regard to the unit region in which the importance level is high, the compression control unit 42 designates, for example, YUV444 as the image format of compression. As a consequence, the transcoder 24 executes the compression at a low compression ratio. In regard to the unit region in which the importance level is low, the compression control unit 42 designates, for example, YUV420 as the image format of compression. As a consequence, the transcoder 24 executes the compression at a high compression ratio.

Method of Calculating Importance Level

Figure 8:
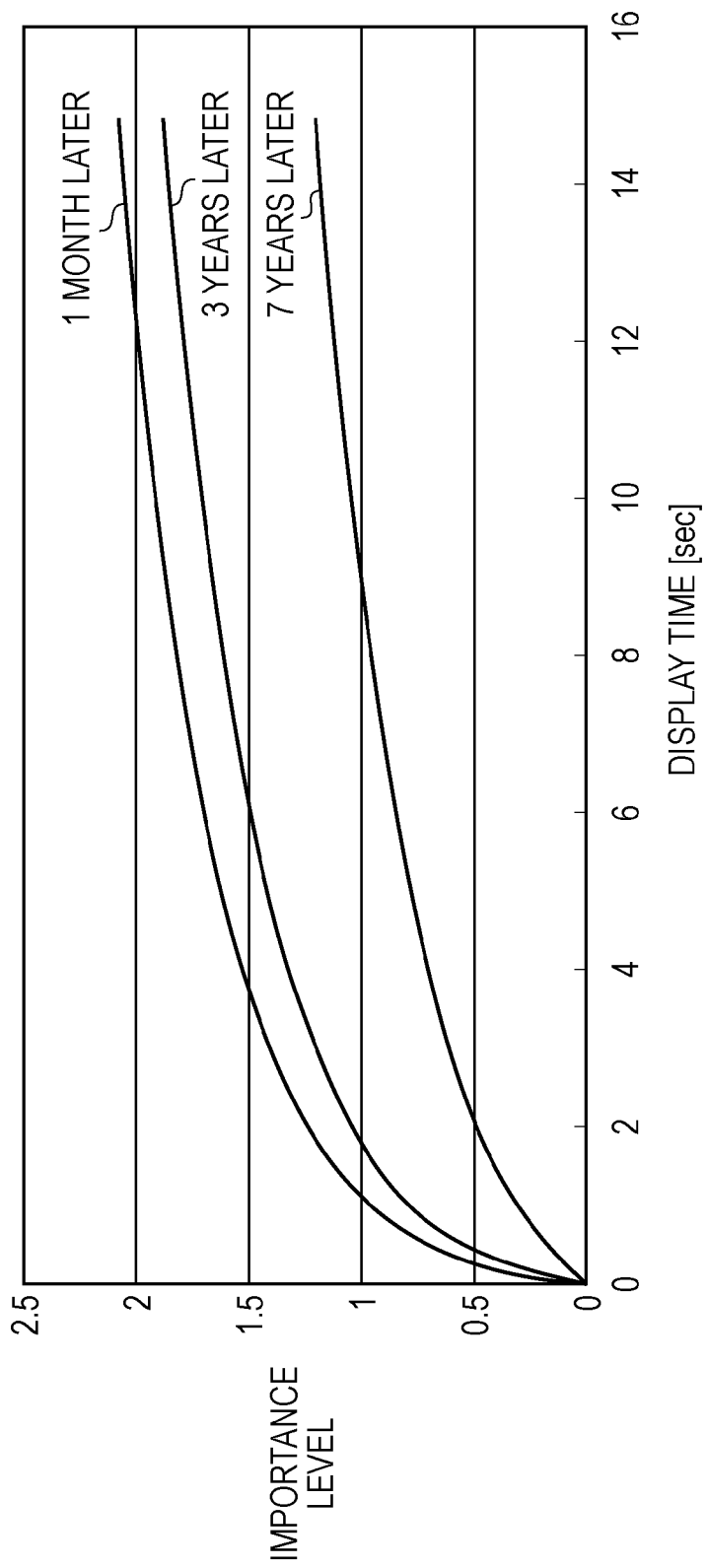
FIG. 8 is a diagram illustrating a method of calculating an importance level in a compression control unit.

FIG. 8 is a diagram illustrating a method of calculating the importance level map in the compression control unit 42 (see FIG. 4).

The compression control unit 42 calculates an importance level PI of each unit region by Equation (1).

$$PI = \log(TD \times \alpha + 1) + Poff \quad (1)$$

In Equation (1), TD is a display time (second) of the unit display. Further, $\alpha$ is a parameter that varies at a timing at which the stored image is compressed and Poff is a parameter that varies depending on whether the unit region is the mark region.

In the storage managing process of FIG. 6, the compression (recompression) of the stored image is executed at the timing at which the user browses the stored image and the elapsed time then becomes the set time, as described above.

The parameter $\alpha$ is set to be larger as the set time is shorter (is set to be smaller as the set time is longer).

That is, for example, when 3 months, 3 years, and 7 years are set as the set time, as described above, 8, 5, and 1 are set as the parameter $\alpha$ for 3 months, 3 years, and 7 years, respectively.

Accordingly, even when the display time TD is the same, the importance level, which is calculated in the storage managing process executed at the timing at which the user browses the stored image and the elapsed time is then a long set time such 7 years, is smaller than the importance level, which is calculated in the storage managing process executed at the timing at which the user browses the stored image and the elapsed time is then a short set time such as 3 months. As a consequence, as the elapsed time is longer, the stored image is compressed at a higher compression ratio.

FIG. 8 shows a relationship between the display time and the importance level calculated by Equation (1) when the parameter Poff is 0 and the set times are 3 months, 3 years, and 7 years.

In FIG. 8, it can be understood that the higher importance level is calculated as the display time is longer and the lower importance level is calculated as the set time is longer. Accordingly, the stored image is compressed at a lower compression ratio in the unit region in which the display time is longer. Further, the stored image is compressed at a higher compression ratio as the elapsed time is longer.

Thus, since the stored image is compressed at a higher compression ratio when the elapsed time is longer, the data amount of stored image is further reduced as the elapsed time is longer after the user browses the stored image.

As described above, the parameter Poff in Equation (1) varies depending on whether the unit region is the mark region. When the unit region is not the mark region, the parameter Poff is set to 0. When the unit region is the mark region, the parameter Poff is set to a value such as 5 larger than 0.

In regard to the unit region which is the mark region and the unit region which is not the mark region, the importance level of the unit region which is the mark region is higher than the importance level of the unit region which is not the mark region according to Equation (1), even when the display time is the same.

As a consequence, the unit region which is the mark region is compressed at a compression ratio lower than that of the unit region which is not the mark region (the unit region which is not the mark region is compressed at a compression ratio higher than that of the unit region which is the mark region).

Method of Generating Q value Map

Figure 9:
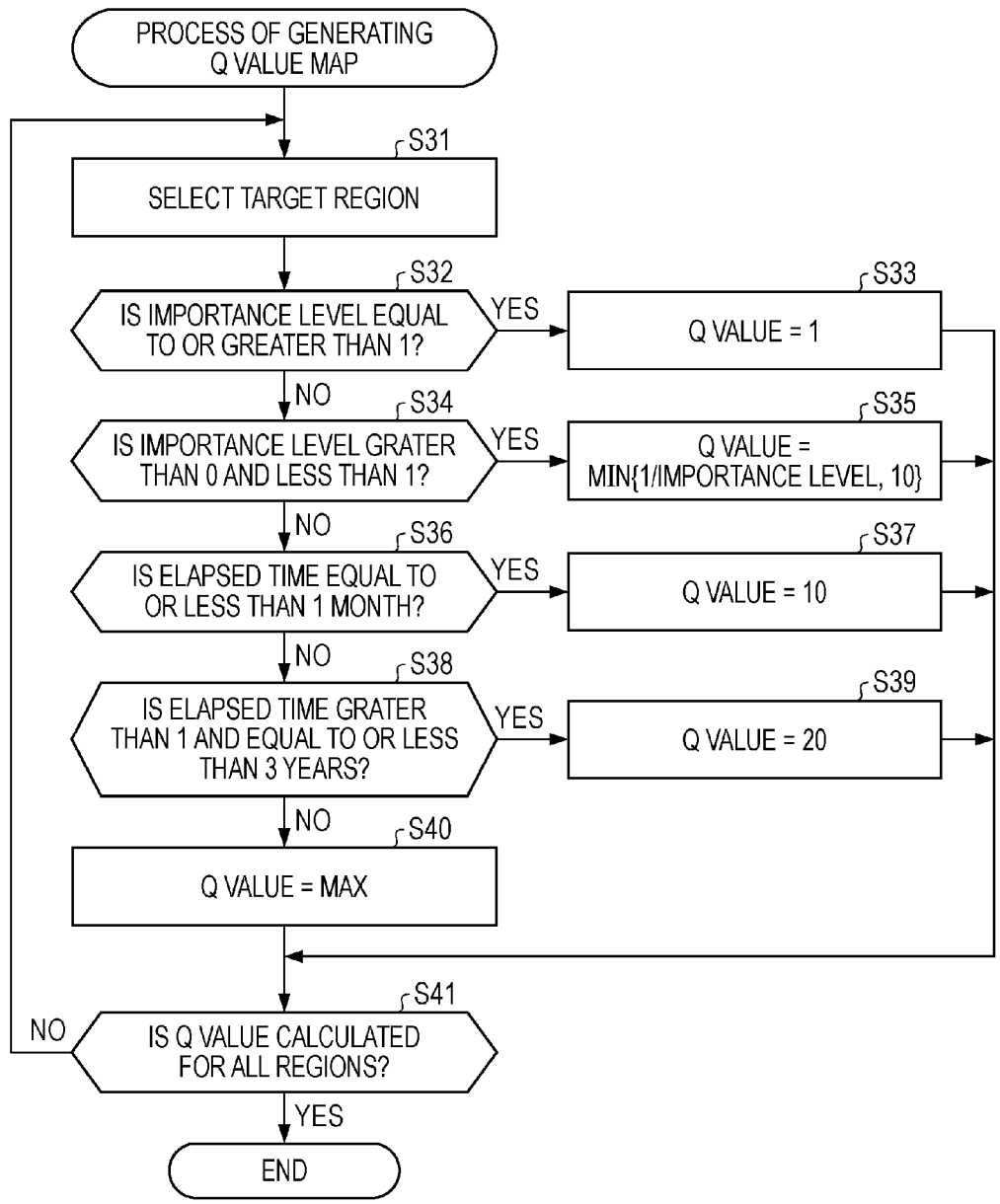
FIG. 9 is a flowchart illustrating a process of generating a Q value map.

FIG. 9 is a flowchart illustrating a process of generating the Q value map by the compression control unit 42 (see FIG. 4) in step S13-3 of FIG. 6.

In step S31, the compression control unit 42 selects one of the unit regions for which the quantization step is not yet obtained among the unit regions of the stored image, as a target region which is the unit region for which the quantization step is obtained.

Further, the compression control unit 42 recognizes the importance level of the target region based on the importance level map, and then the process proceeds from step S31 to step S32.

In step S32, the compression control unit 42 determines whether the importance level of the target region is equal to or greater than, for example, 1.

When the compression control unit 42 determines that the importance level of the target region is equal to or greater than 1 in step S32, the process proceeds to step S33. Then, the compression control unit 42 sets the quantization step (Q value) of the target region to, for example, 1 which is the minimum value and the process proceeds to step S41.

On the other hand, when the compression control unit 42 determines that the importance level of the target region is not equal to or greater than 1 in step S32, the process proceeds to step S34. Then, the compression control unit 42 determines whether the importance level of the target region is equal to or greater than 0.

When the compression control unit 42 determines that the importance level of the target region is greater than 0 in step S34, that is, the importance level of the target region is larger than 0 and less than 1, the process proceeds to step S35. Then, the compression control unit 42 sets the quantization step of the target region to, for example, MIN {1/importance level, 10}, that is, a smaller value between 1/importance level and 10, and then the process proceeds to step S41.

When the compression control unit 42 determines that the importance level of the target region is greater than 0 in step S34, that is, the importance level of the target region is 0 which is the minimum, the process proceeds to step S36. Then, the compression control unit 42 determines whether the elapsed time is equal to or greater than 1 month after the user browses the stored image.

When the compression control unit 42 determines that the elapsed time is equal to or greater than 1 month after the user browses the stored image in step S36, that is, the importance level of the target region is set to 0 and the elapsed time is equal to or less than 1 month, the process proceeds to step S37. Then, the compression control unit 42 sets the quantization step of the target region to, for example, 10 and the process proceeds to step S41.

When the compression control unit 42 determines that the elapsed time is not equal to or greater than 1 month after the user browses the stored image in step S36, the process proceeds to step S38. Then, the compression control unit 42 determines whether the elapsed time is equal to or less than 3 years.

When the compression control unit 42 determines that the elapsed time is equal to or less than 3 years in step S38, that is, the importance level of the target region is set to 0 and the elapsed time is greater than 1 month and equal to or less than 3 years, the process proceeds to step S39. Then, the compression control unit 42 sets the quantization step to, for example, 20 and the process proceeds to step S41.

When the compression control unit 42 determines that the elapsed time is not equal to or less than 3 years in step S38, that is, the importance level of the target region is set to 0 and the elapsed time is greater than 3 years, the process proceeds to step S40. Then, the compression control unit 42 sets the quantization step of the target region to, for example, the maximum value MAX, the process proceeds to step S41.

In step S41, the compression control unit 42 determines whether all the quantization steps (Q values) of the unit regions of the stored image are obtained.

When the compression control unit 42 determines that all the quantization steps (Q values) of the unit regions of the stored image are not obtained in step S41, that is, the unit region for which the quantization step is not obtained is present, the process returns to step S31.

In step S31, the compression control unit 42 newly selects, as the target region, one of the unit regions for which the quantization step is not obtained among the unit regions of the stored image, and the same processes are repeated.

On the other hand, when the compression control unit 42 determines that all the quantization steps (Q values) of the unit regions of the stored image are not obtained in step S41, the compression control unit 42 generates the Q value map in which the quantization step of the unit region is registered for each unit region. Then, the process of generating the Q value map ends.

In this way, as the importance is higher, the value of the quantization step of the unit region is smaller. In the unit region (the unit region in which the importance level is 0 in FIG. 9) in which the importance level is small to some extent, the value of the quantization step is large as the elapsed time is long after the user browses the stored image.

The operation history is stored in the storage 25 of the image storage apparatus 12 in FIG. 2. However, whenever the operation data is supplied from the image display apparatus 13, the importance level map and the Q value map may be generated in the image storage apparatus 12 and the importance level map and the Q value map may be stored instead of the operation history in the storage 25.

The case has hitherto been described in which the specific time is calculated as the display time of the unit region by using the operation time $T_n$ (see FIG. 5) (the difference information $\Delta T_n$). However, as the display time of the unit region, 0 representing that the unit region has not been displayed and 1 representing that the unit region has been displayed may be used. In this case, it is not necessary to allow the operation time $T_n$ to be included in the operation data.

Further, the case has hitherto been described in which the display time of the unit region is calculated based on the operation history. However, for example, the image storage apparatus 12 may store the time, at which a request from the image display apparatus 13 is given, for the unit region of the image for which the request is given and may the time measured until a request of the subsequent image is given as the display time of the unit region of the image for which the immediately previous request is given.

Method of Generating Q Value Map in Which Plurality of Users are Present

Figure 10:
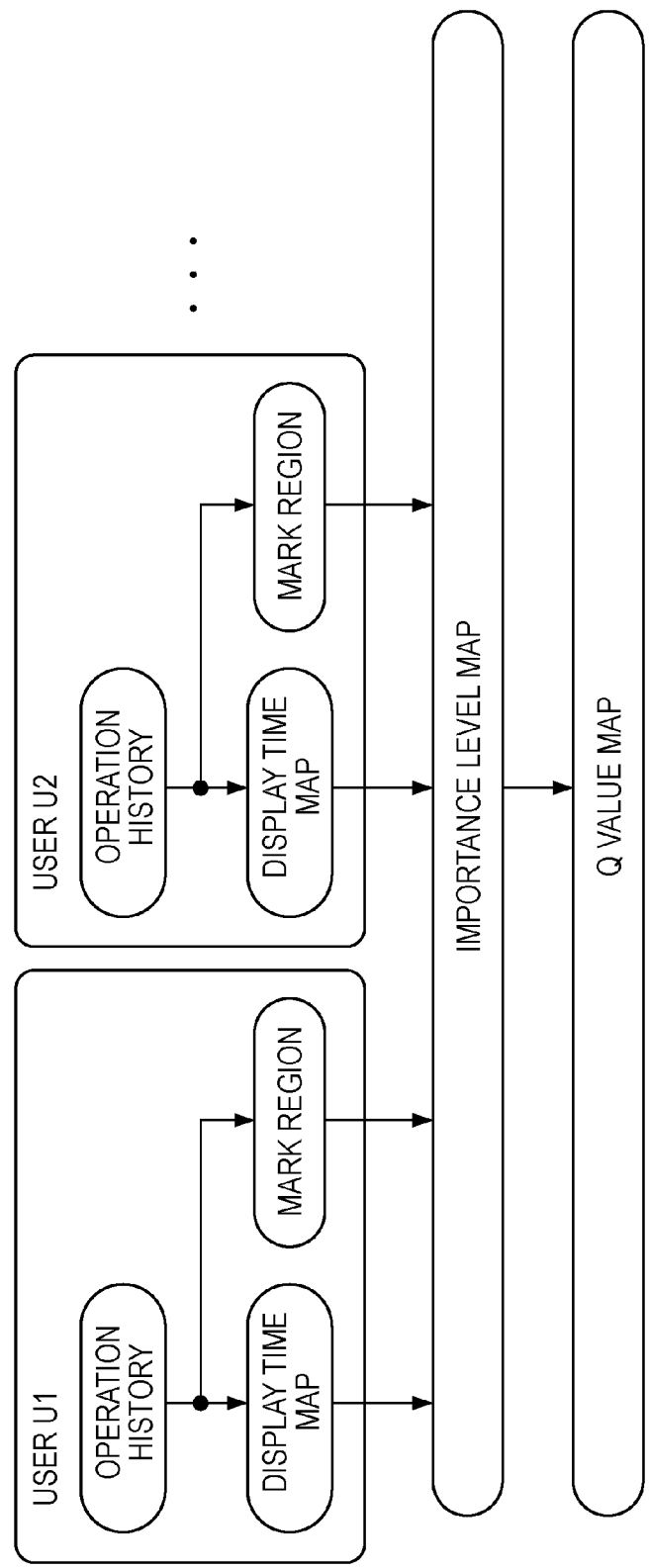
FIG. 10 is a diagram illustrating a method of generating the Q value map when a plurality of users are present.

FIG. 10 is a diagram illustrating a method of generating the Q value map when a plurality of users are present.

For example, when the plurality of users use the image display apparatus 13, the image storage apparatus 12 (see FIG. 2) stores the operation history for each user in the storage 25.

In the image display system shown in FIG. 1, not only the image display apparatus 13 but also one or more apparatuses similar to the image display apparatus 13, may be connected to the image storage apparatus 12. Even in this case, the operation history is stored in the storage 25 for each user using the image display apparatus 13 or another apparatus similar to the image display apparatus 13.

Thus, when the operation history is stored in the storage 25 for each of the plurality of users, the Q value map can be generated based on the operation histories of the plurality of users, as shown in FIG. 10.

That is, when the operation history is stored in the storage 25 for each of the plurality of users, the storage managing unit 22 generates the display time map and recognizes the mark region (the unit region which is the mark region) based on the operation history of each of the plurality of users.

Further, the storage managing unit 22 integrates the display times registered in the display time map generated for each of the plurality of users for each unit region and generates the importance level map based on the integration value of the display times integrated for each unit region and the mark region recognized for each of the plurality of users by Equation (1).

The storage managing unit 22 generates the Q value map based on the importance level map, as described with reference to FIG. 9.

Furthermore, the storage managing unit 22 can generate the importance level map in which the importance level of each unit region is registered for each of the plurality of users, calculate the maximum value of the importance level for each unit region, and generate the map, in which the maximum value of the importance level is registered for each unit region, as the final importance level map.

In this case, the storage managing unit 22 generates the Q value map based on the final importance level map.

Method of Generating Importance Level Map

Figure 11:
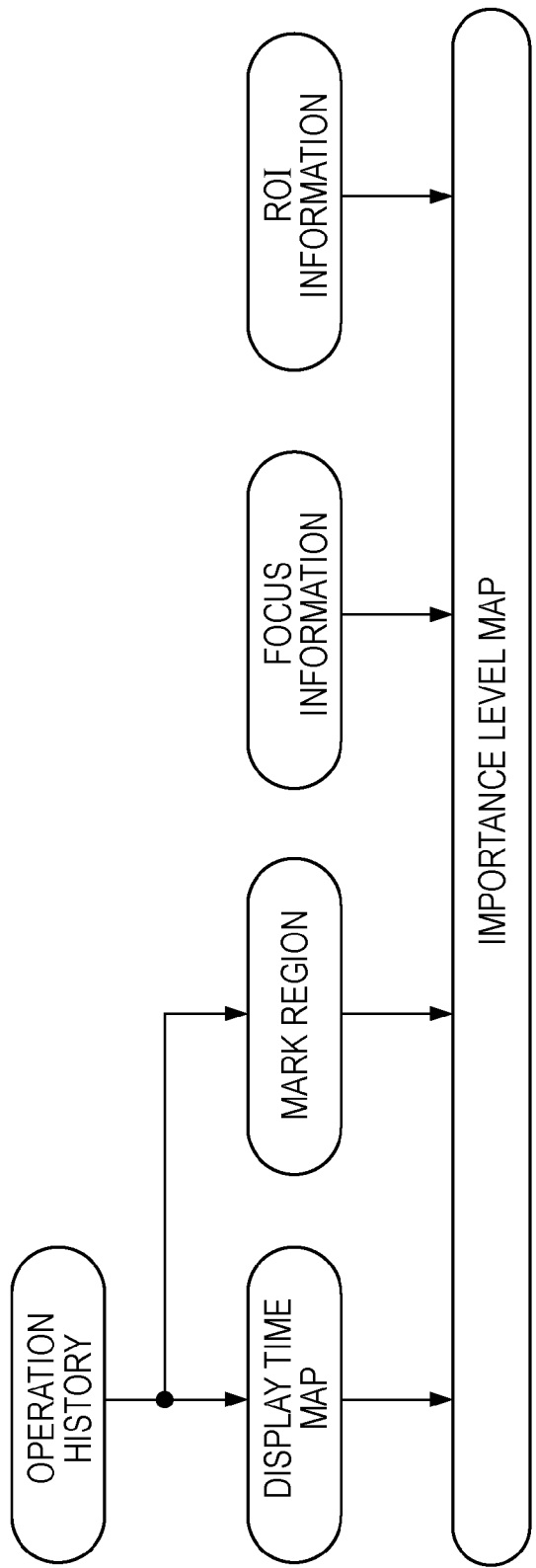
FIG. 11 is a diagram illustrating a method of generating an importance level map.

FIG. 11 is a diagram illustrating another example of the method of generating the importance level map in the storage managing unit 22 (the compression control unit 42 of the storage managing unit 22).

The case has hitherto been described in which the storage managing unit 22 generates the importance level map based on the display time of each unit region and the mark region. However, when information other than the mark region and the display time of each unit region are given, the importance level map can be generated based on the information.

That is, for example, when focus information indicating the focus state when an image is captured is supplied from the camera of the image acquiring apparatus 11 to the storage managing unit 22, the storage managing unit 22 can generate the importance level map based on the focus information.

Specifically, for example, when the importance level of the focus-deviated unit region can be set to be smaller than the importance level of the focused unit region.

For example, when ROI (Region of Interest) information indicating a region, which the user is interested in, in regard to the stored image is supplied to the storage managing unit 22, the storage managing unit 22 can generate the importance level map based on the ROI information.

Specifically, the importance level of the region which the user is less (low) interested in can be set to be smaller than the importance level of the region which the user is interested in.

Image Display System According to Second Embodiment of the Present Technology

Figure 12:
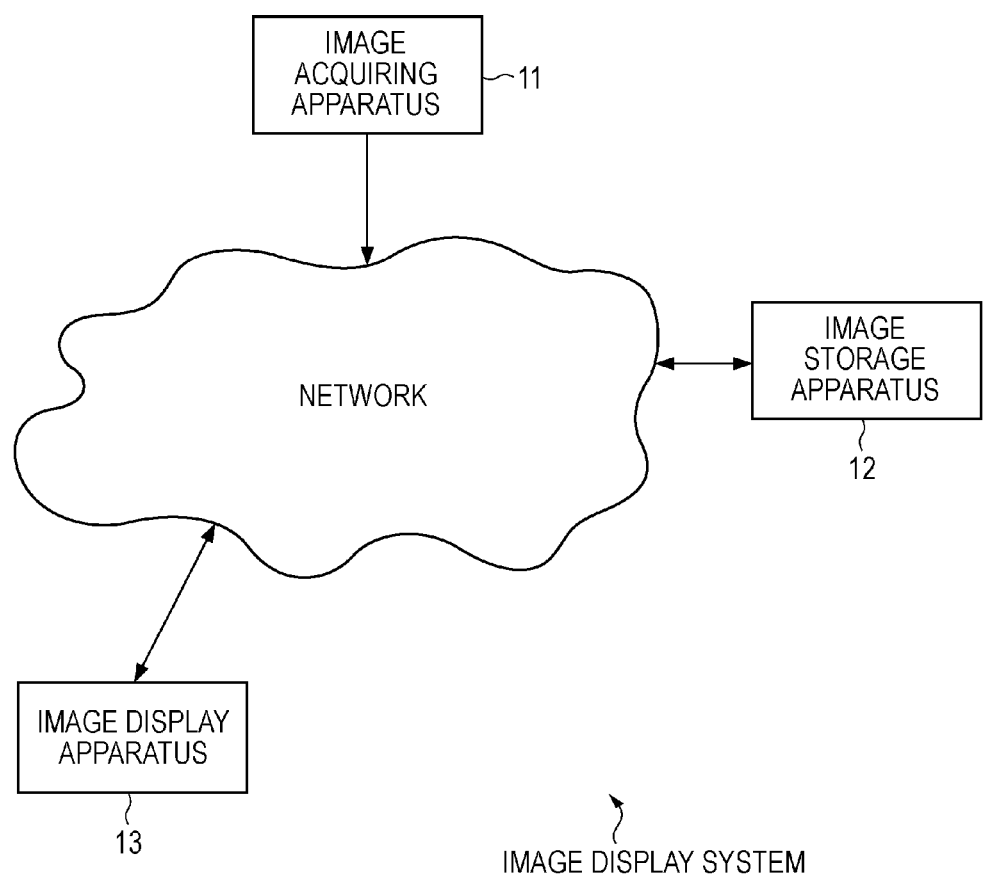
FIG. 12 is a block diagram illustrating an example of the configuration of the image display system, to which an information processing apparatus of the present technology is applied, according to a second embodiment of the present technology.

FIG. 12 is a block diagram illustrating an example of the configuration of the image display system, to which an information processing apparatus of the present technology is applied, according to a second embodiment of the present technology.

The same reference numerals are given to the constituent elements corresponding to the constituent elements in FIG. 1 and the description thereof will not be repeated.

The image display system in FIG. 12 is the same as the image display system in FIG. 1 in that the image display system includes an image acquiring apparatus 11, an image storage apparatus 12, and an image display apparatus 13.

However, the image display system in FIG. 12 is different from the image display system in FIG. 1 in that the image acquiring apparatus 11, the image storage apparatus 12, and the image display apparatus 13 are connected to each other a network such as the Internet or an LAN (Local Area Network) and exchange data via the network.

Since the image acquiring apparatus 11, the image storage apparatus 12, and the image display apparatus 13 of the image display system in FIG. 12 are the same as those in FIG. 1 except that the data is exchanged via the network, the description thereof will not be repeated.

Image Display System According to Third Embodiment of the Present Technology

Figure 13:
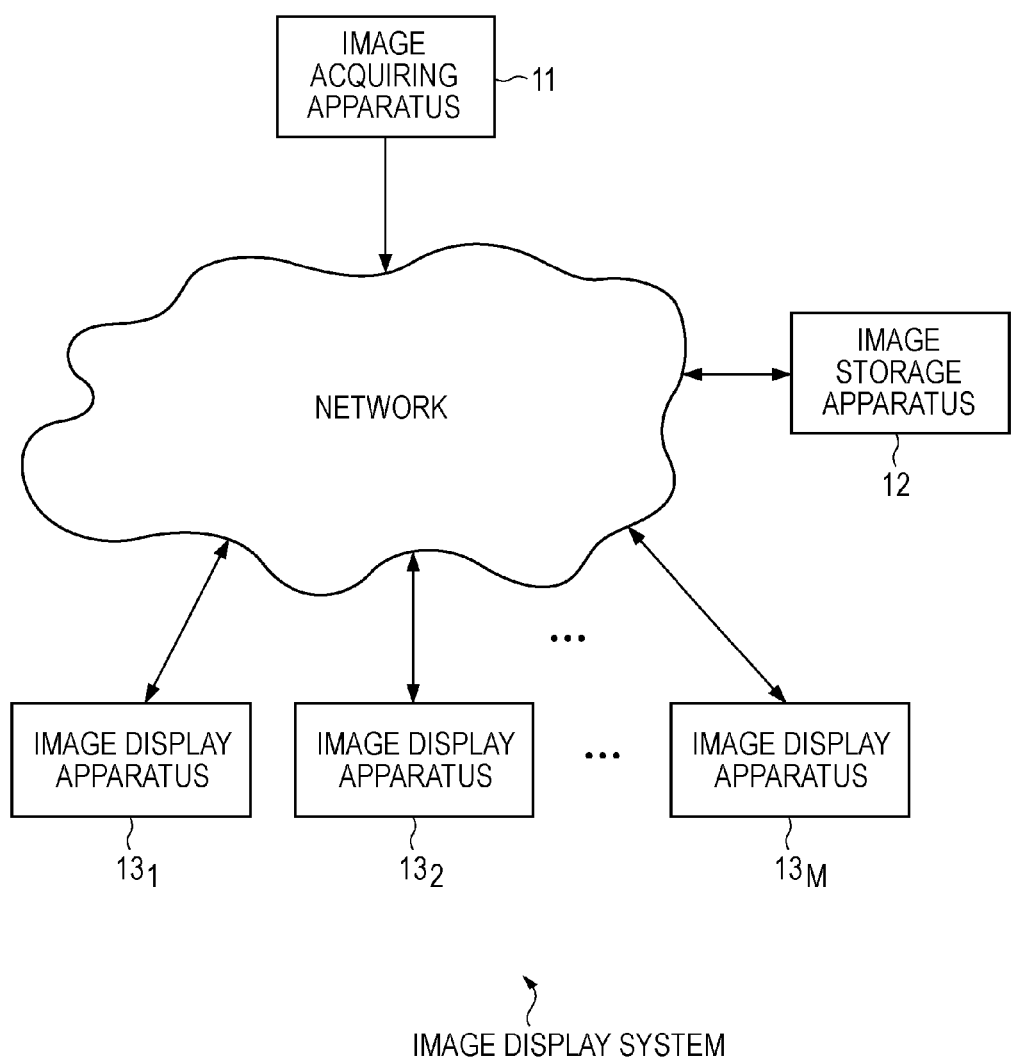
FIG. 13 is a block diagram illustrating an example of the configuration of the image display system, to which an information processing apparatus of the present technology is applied, according to a third embodiment of the present technology.

FIG. 13 is a block diagram illustrating an example of the configuration of the image display system, to which an information processing apparatus of the present technology is applied, according to a third embodiment of the present technology.

The same reference numerals are given to the constituent elements corresponding to the constituent elements in FIG. 12 and the description thereof will not be repeated.

The image display system in FIG. 13 is the same as the image display system in FIG. 12 in that the image display system includes the image acquiring apparatus 11 and the image storage apparatus 12, and the image acquiring apparatus 11 and the image storage apparatus 12 are connected to each other a network.

However, the image display system in FIG. 13 is different from the image display system in FIG. 12 in that the image display system includes a plurality of M image display apparatuses $13_1$, $13_2$, ..., $13_M$ and each image display apparatus $13_m$ (where m=1, 2, ..., M) is connected to each other the network.

The image display apparatus $13_m$ has the same configuration as that of the image display apparatus 13.

In the image display system shown in FIG. 13, operation data are transmitted from the image display apparatuses $13_1$ to $13_M$ to the image storage apparatus 12 via the network. The operation history generated for each of the image display apparatuses $13_1$ to $13_M$ based on the operation data is stored in the image storage apparatus 12. The importance level map and the Q value map are generated, for example, as described with reference to FIG. 10, based on the operation history for each of the plurality of image display apparatuses $13_1$ to $13_M$.

Image Display System According to Fourth Embodiment of the Present Technology

Figure 14:
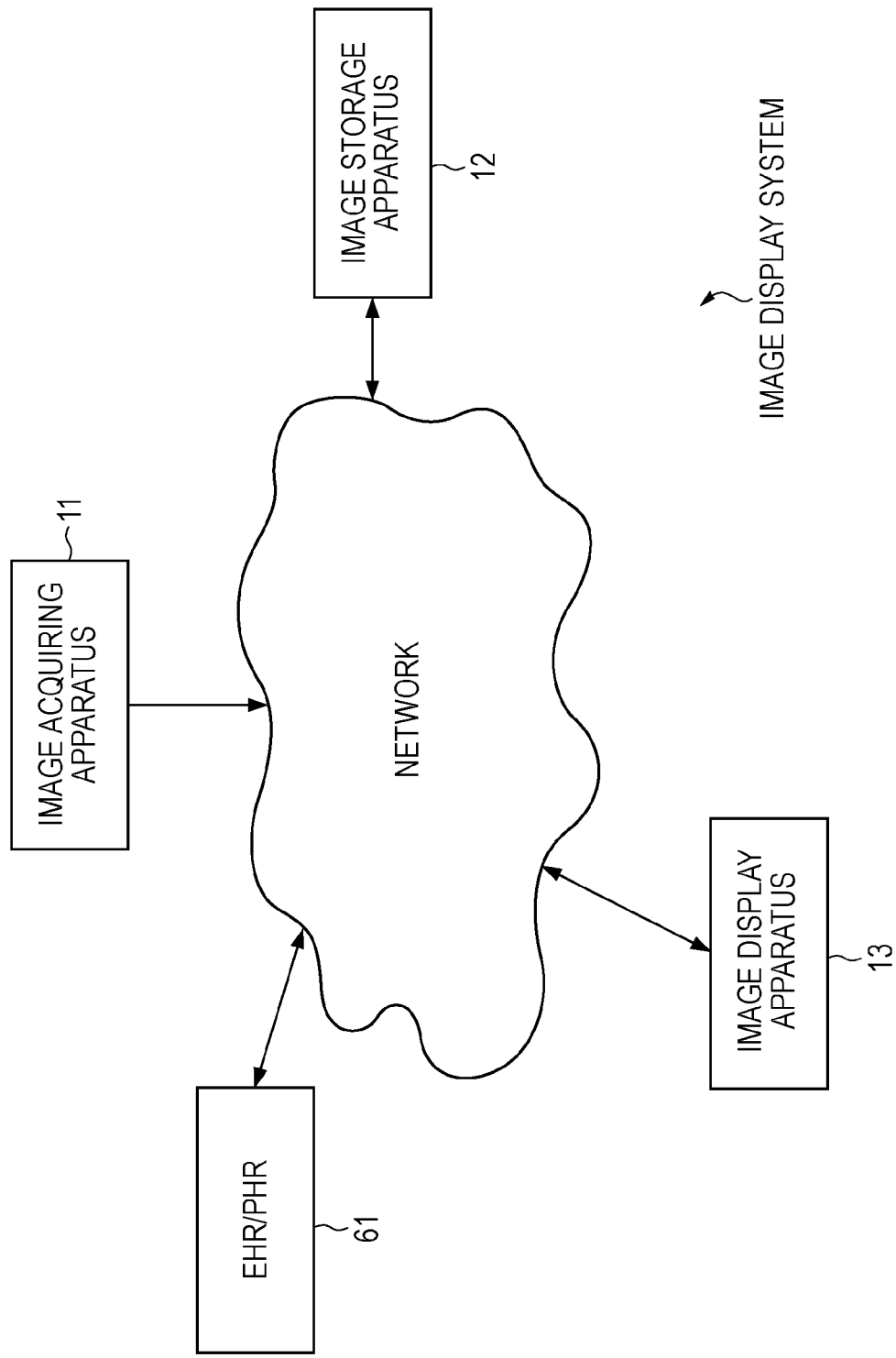
FIG. 14 is a block diagram illustrating an example of the configuration of the image display system, to which an information processing apparatus of the present technology is applied, according to a fourth embodiment of the present technology.

FIG. 14 is a block diagram illustrating an example of the configuration of the image display system, to which an information processing apparatus of the present technology is applied, according to a fourth embodiment of the present technology.

The same reference numerals are given to the constituent elements corresponding to the constituent elements in FIG. 12 and the description thereof will not be repeated.

The image display system in FIG. 14 is the same as the image display system in FIG. 12 in that the image display system includes the image acquiring apparatus 11, the image storage apparatus 12, and the image display apparatus 13 and the image acquiring apparatus 11, the image storage apparatus 12, and the image display apparatus 13 are connected to each other a network.

However, the image display system in FIG. 14 is different from the image display system in FIG. 12 in that an EHR/PER (Electronic Health Record/Personal Health Record) 61 is connected to the network.

For example, When the stored image is an image obtained by photographing a sample of a pathological tissue of a patient and information regarding the patient is stored in the EHR/PER 61, in the image storage apparatus 12, for example, the death day of the patent is acquired from the EHR/PER 61 and an elapsed time from the death day can be used instead of the elapsed time measured after the user browses the stored image.

Image Display System According to Fifth Embodiment of the Present Technology

Figure 15:
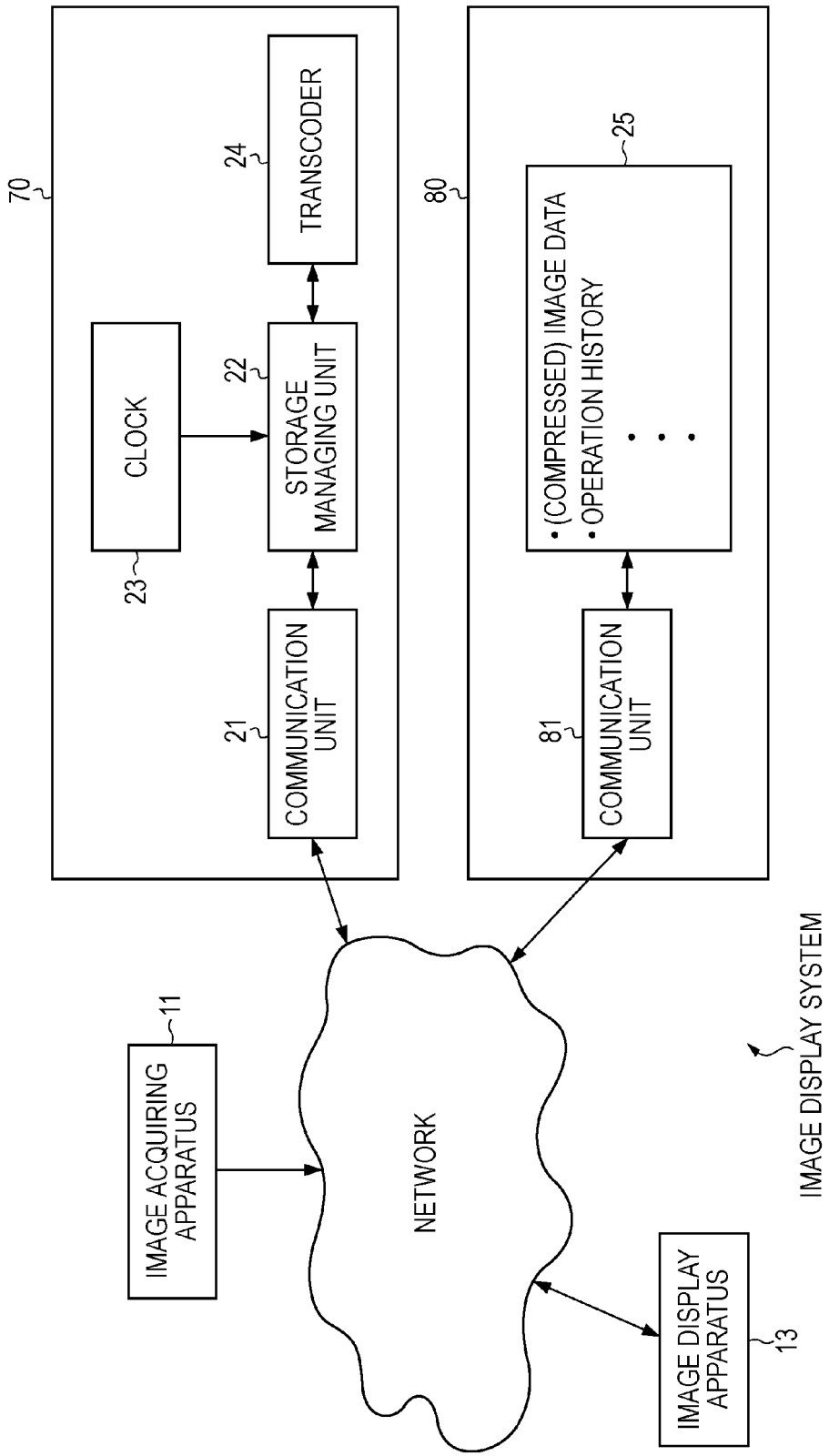
FIG. 15 is a block diagram illustrating an example of the configuration of the image display system, to which an information processing apparatus of the present technology is applied, according to a fifth embodiment of the present technology.

FIG. 15 is a block diagram illustrating an example of the configuration of the image display system, to which an information processing apparatus of the present technology is applied, according to a fifth embodiment of the present technology.

The same reference numerals are given to the constituent elements corresponding to the constituent elements in FIGS. 12 and 2 and the description thereof will not be repeated.

The image display system in FIG. 15 is the same as the image display system in FIG. 12 in that the image display system includes the image acquiring apparatus 11 and the image display apparatus 13, and the image acquiring apparatus 11 and the image display apparatus 13 are connected to each other a network.

However, the image display system in FIG. 15 is different from the image display system in FIG. 12 in that a management apparatus 70 and a storage apparatus 80 are provided instead of the image storage apparatus 12 and the management apparatus 70 and the storage apparatus 80 are connected to the network.

The management apparatus 70 includes a communication unit 21, a storage managing unit 22, a clock 23, and a transcoder 24.

The storage apparatus 80 includes a communication unit 81, which has the same configuration as that of the communication unit 21, and a storage 25.

The management apparatus 70 and the storage apparatus 80 can exchange data via the network, and thus the management apparatus 70 and the storage apparatus 80 integrally function as the image storage apparatus 12.

Case where Stored Images are Image of Plurality of Magnifications Obtained by Photographing Same Subject at Plurality of Magnifications The image acquiring apparatus 11 sometimes images a sample of a pathological tissue, for example, by changing the magnification of a microscope to various values and consequently acquires images of the plurality of magnifications obtained by photographing the same subject (sample) at the plurality of magnifications.

In this case, the image storage apparatus 12 stores (records), as the stored images, the images of the plurality of magnifications obtained by photographing the same subject at the plurality of magnifications by the image acquiring apparatus 11.

Thus, when the image storage apparatus 12 stores the images of the plurality of magnifications as the stored images, the user can operate the input UI 34 of the image display apparatus 13 to display the image of any magnification among the images of the plurality of magnifications.

Further, the image storage apparatus 12 generates the display time map for each of the images of the plurality of magnifications and generates the importance level map and the Q value map based on the display time map.

The image storage apparatus 12 controls the compression of the image of each magnification based on the Q value map for the image of this magnification.

When the image display apparatus 13 displays the image of a given magnification f among the images of the plurality of magnifications as the stored images and the user executes the mark operation, the image storage apparatus 12 sets the importance level of the mark region, which is the unit region included in the display region subjected to the mark operation, to a large value in the importance level map for the image of the magnification f.

Thus, when the image of the given magnification f is displayed and the mark operation is executed, the unit region included in the region of the image of another magnification corresponding to the display region subjected to the mark operation other than the display region subjected to the mark operation in the image of the magnification f can be considered to be a so-called pseudo-mark region subjected to a pseudo-mark operation and the importance level can be set to a large value.

Figure 16:
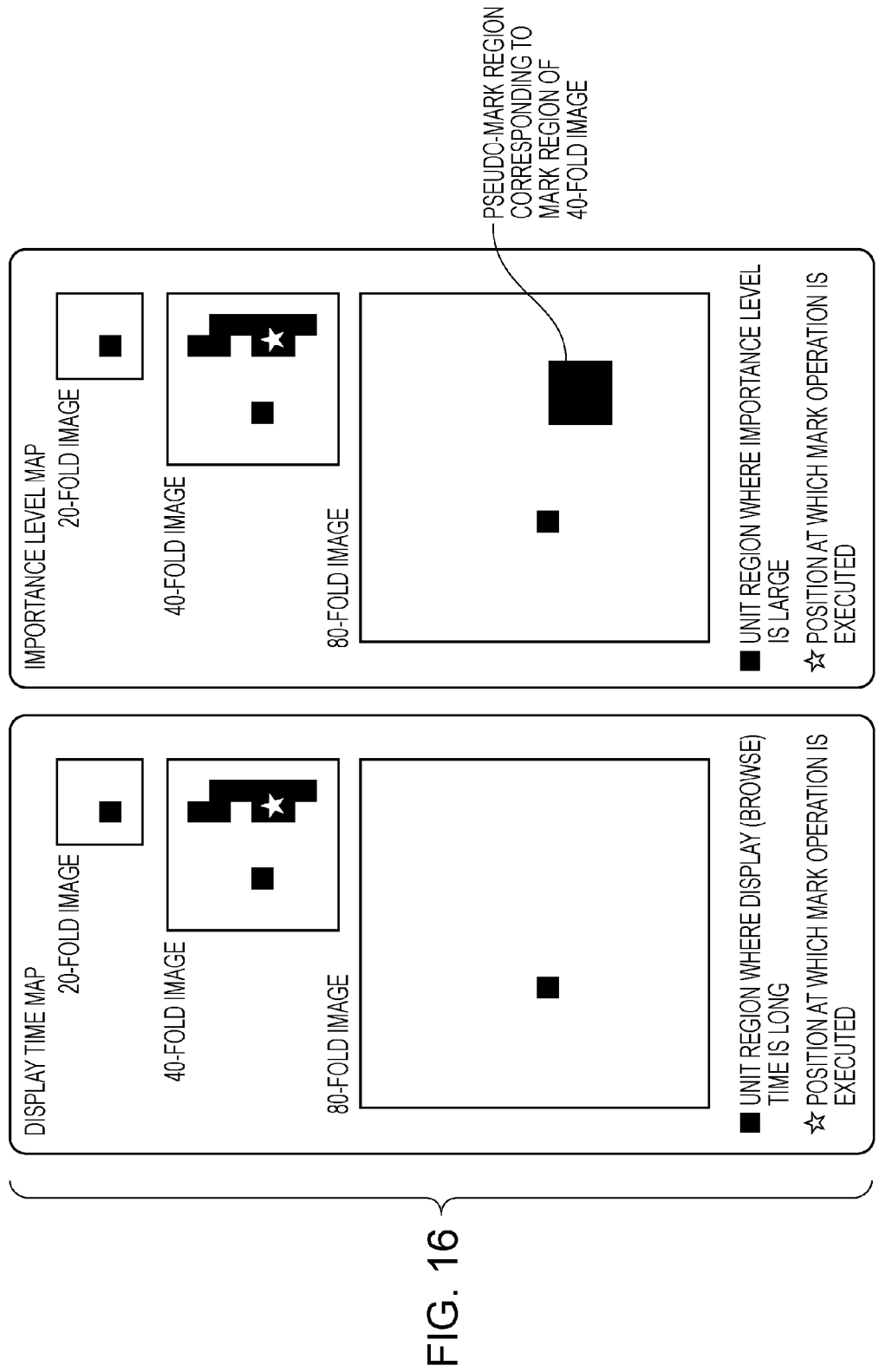
FIG. 16 is a diagram illustrating calculation of a higher importance level for a pseudo-mark region, which is a region corresponding to a mark region, of an image with a magnification different from that of the mark region of an image with a magnification f in which a user executes a mark operation.

FIG. 16 is a diagram illustrating a method of calculating a higher importance level of the pseudo-mark region which is the region corresponding to the mark region of an image of a magnification different from the mark region of the image of the magnification f, when the mark operation is executed on the image of a magnification f among the images of the plurality of magnifications, as described above.

That is, FIG. 16 schematically shows the display time map and the importance level map for each of the images of the plurality of magnifications as the stored images.

FIG. 16 shows an image (20-fold image) of a 20-fold magnification, an image (40-fold image) of a 40-fold magnification, and an image (80-fold image) of a 80-fold magnification as the images of the plurality of magnifications and shows the display time maps and the importance level maps for the 20-fold image, the 40-fold image, and the 80-fold image.

In the display time maps of the 20-fold image, the 40-fold image, and the 80-fold image, a portion colored with black indicates the unit region in which the display time is long.

In the importance level maps of the 20-fold image, the 40-fold image, and the 80-fold image, a portion colored with black indicates the unit region in which the importance level is high.

In the display time map and the importance level map of the 40-fold image, the start indicates a position in which the mark operation is executed when the 40-fold image is displayed. The display region (the unit region included in the display region) subjected to the mark operation is the mark region.

In FIG. 16, when the 40-fold image is displayed, the mark operation is executed and the display region subjected to the mark operation is the mark region. In the importance level map, the importance level of the mark region becomes higher.

In FIG. 16, even in the 80-fold image not subjected to the mark operation, the region corresponding to the mark region of the 40-fold image is set as the pseudo-mark region and the importance level of the pseudo-mark region is large.

In FIG. 16, in the 20-fold image, the importance level of the region corresponding to the mark region of the 40-fold image is not large. However, in the 20-fold image, the region corresponding to the mark region of the 40-fold image can be set to the pseudo-mark region and the importance level of the pseudo-mark region can be set to be large.

Here, for example, when the maximum magnification is 80 folds and the images of the plurality of magnifications obtained by reducing the magnification by ½, that is, a 80-fold image, a 40-fold image, a 20-fold image, a 10-fold image, a 5-fold image, 2.5-fold image, and the like are the stored image, the 80-fold image, the 40-fold image, and the 20-fold image occupy about 98% of the data amount of the stored images.

Accordingly, the image storage apparatus 12 can set only the 80-fold image, the 40-fold image, and the 20-fold image of the high magnifications occupying most of the data amount of the stored images as targets to be subjected to the storage managing process described in FIG. 6 and can set the images of the magnifications less than 20-fold magnifications as images (which are not recompressed after stored in the image storage apparatus 12) which are not subjected to the storage managing process described in FIG. 6.

When the images of the plurality of magnifications are the stored images, as described above, the data amount of images of the high magnifications have a considerable influence on the data amount of stored images. Therefore, the image storage apparatus 12 can obtain a lower importance level for an image of a high magnification.

That is, the image storage apparatus 12 can calculate an importance level PI of a unit region, for example, by Equation (2) instead of Equation (1).

$$PI = \log(TD \times \alpha \times \beta + 1) + Poff \qquad (2)$$

In Equation (2), TD is a display time (second) of the unit display, α is a parameter that varies at a timing at which the stored image is compressed, and Poff is a parameter that varies depending on whether the unit region is the mark region, as in Equation (1).

In Equation (2), $\beta$ is a parameter that varies in accordance with the magnification of an image (hereinafter, also referred to as a target image) including the unit region for which the importance level PI is calculated.

The parameter $\beta$ is set to be smaller as the magnification of the target image is higher.

That is, for example, when the magnification of the target image is 80 folds, the parameter $\beta$ is set to 1. When the magnification of the target image is 40 folds, the parameter $\beta$ is set to 1.5. Further, when the magnification of the target image is 20 folds, the parameter $\beta$ is set to 2.

Accordingly, the importance level PI is lower as the magnification of the target image is higher. As a consequence, the image is compressed at a higher compression ratio in the unit region of the image of a higher magnification.

Method of Calculating Display Time

Figure 17A:
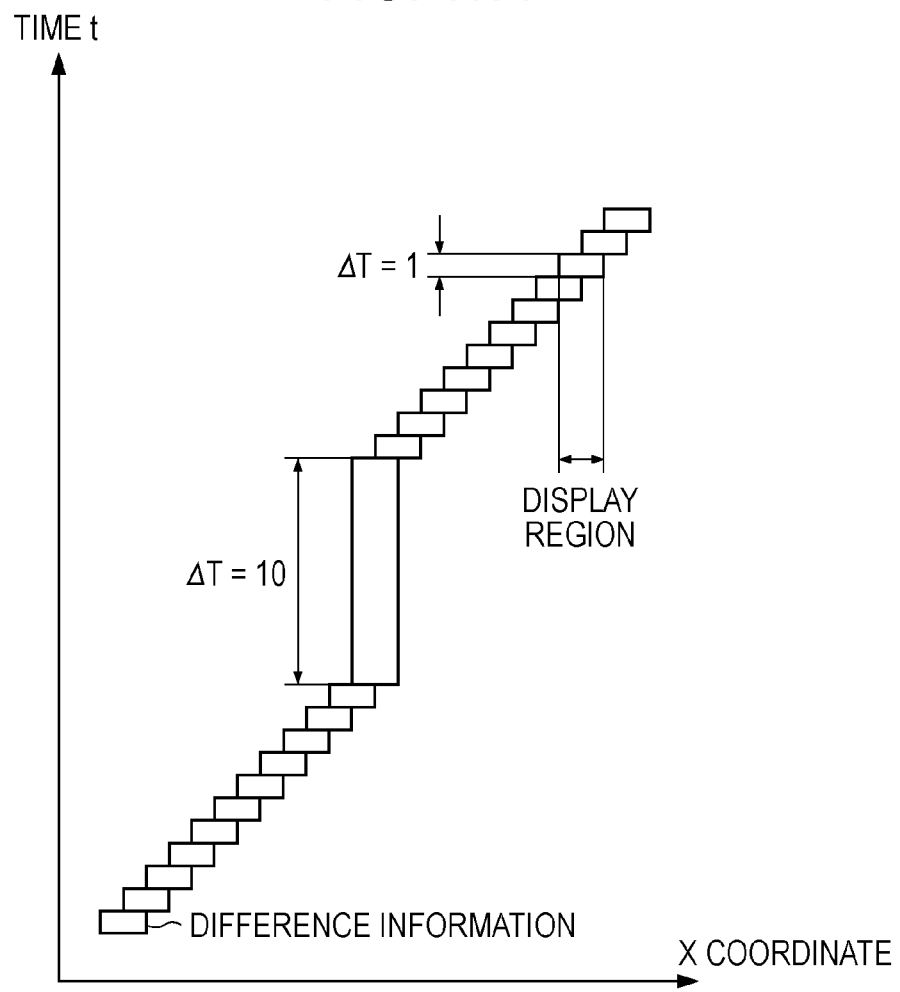
FIGS. 17A and 17B are diagrams illustrating a method of calculating a display time.
Figure 17B:
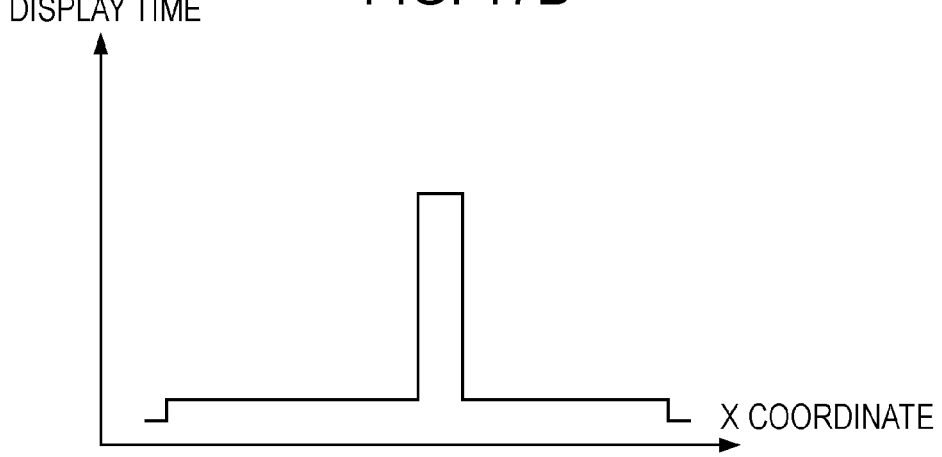

FIGS. 17A and 17B are diagrams illustrating a method of calculating the display time by the storage managing unit 22 (the display time acquiring unit 41 of the storage managing unit 22).

As described with reference to FIG. 5, the operation data [X, Y, Z, S, T] supplied from the image display apparatus 13 to the storage managing unit 22 of the image storage apparatus 12 includes the coordinates (X, Y, Z), the scale S, and the operation time T. Therefore, in regard to operation data [X, Y, Z, S, T], the storage managing unit 22 calculates the difference information [$\Delta X$, $\Delta Y$, $\Delta Z$, $\Delta S$, $\Delta T$] corresponding to the difference between the operation data [X, Y, Z, S, T] and the immediately previous operation data and stores the difference information [$\Delta X$, $\Delta Y$, $\Delta Z$, $\Delta S$, $\Delta T$] as the operation history.

A rectangle in FIG. 17A indicates one piece of difference information [$\Delta X$, $\Delta Y$, $\Delta Z$, $\Delta S$, $\Delta T$].

In FIG. 17A, the horizontal axis represents the x coordinates (the x axis which is the horizontal axis) (which is also the x coordinate X of the operation data [X, Y, Z, S, T]) of the stored image and the vertical axis represents a time t.

In FIG. 17A, the rectangle indicating the difference information [$\Delta X$, $\Delta Y$, $\Delta Z$, $\Delta S$, $\Delta T$] is illustrated at a position corresponding to the coordinate X and the operation time T of the operation data [X, Y, Z, S, T] used (immediately previously used) to calculate the difference information [$\Delta X$, $\Delta Y$, $\Delta Z$, $\Delta S$, $\Delta T$].

The length of the rectangle indicating the difference information [$\Delta X$, $\Delta Y$, $\Delta Z$, $\Delta S$, $\Delta T$] in the horizontal direction corresponds to a display region (hereinafter, also referred to as a display region corresponding to the difference information [$\Delta X$, $\Delta Y$, $\Delta Z$, $\Delta S$, $\Delta T$]) in the horizontal (x) direction in the stored image displayed on the image display apparatus 13, when the operation data [X, Y, Z, S, T] used (immediately previously used) to calculate the difference information [$\Delta X$, $\Delta Y$, $\Delta Z$, $\Delta S$, $\Delta T$] is supplied form the image display apparatus 13 to the storage managing unit 22.

Further, the length of the rectangle indicating the difference information [$\Delta X$, $\Delta Y$, $\Delta Z$, $\Delta S$, $\Delta T$] in the vertical direction corresponds to the display time displayed in the display region corresponding to the indicating the difference information [$\Delta X$, $\Delta Y$, $\Delta Z$, $\Delta S$, $\Delta T$], that is, the component $\Delta T$ of the difference information [$\Delta X$, $\Delta Y$, $\Delta Z$, $\Delta S$, $\Delta T$].

In FIG. 17A, the axes perpendicular to the time t are not only the axis of the x coordinate X of the operation data [X, Y, Z, S, T] but also the axes of the y coordinate Y, the z coordinate Z, and the scale S, but are not illustrated.

FIG. 17A shows the difference information when the display region on the stored image is moved in the direction of the x axis, stops at a given position for a time $\Delta T=10$, and then is moved again in the direction of the x axis.

In FIG. 17 (as in FIGS. 18A to 18C described below), the minimum value (minimum unit) of the time $\Delta T$ is set to 1 and corresponds to the minimum time in which the image display apparatus 13 generates the operation data and then generates the subsequent operation data.

FIG. 17B shows the display time of each unit region when the display region on the stored image is moved as in FIG. 17A.

In FIG. 17B, the horizontal axis represents the x coordinate of the unit region and the vertical axis represents the display time of the unit region.

The display time of each unit region can be calculated by integrating the time $\Delta T$ of the rectangle in the vertical direction, which indicates the difference information [$\Delta X$, $\Delta Y$, $\Delta Z$, $\Delta S$, $\Delta T$], in the vertical direction in FIG. 17A.

Figure 18A:
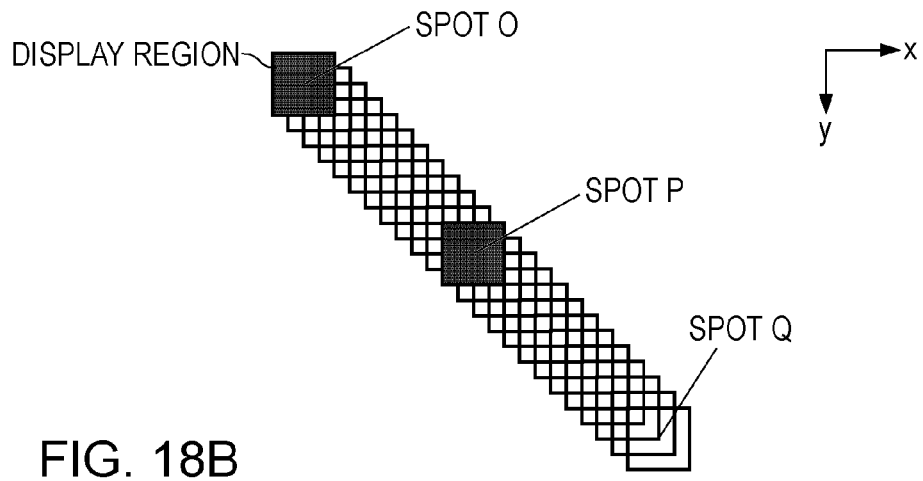
FIGS. 18A to 18C are diagrams illustrating a method of calculating the display time.
Figure 18B:
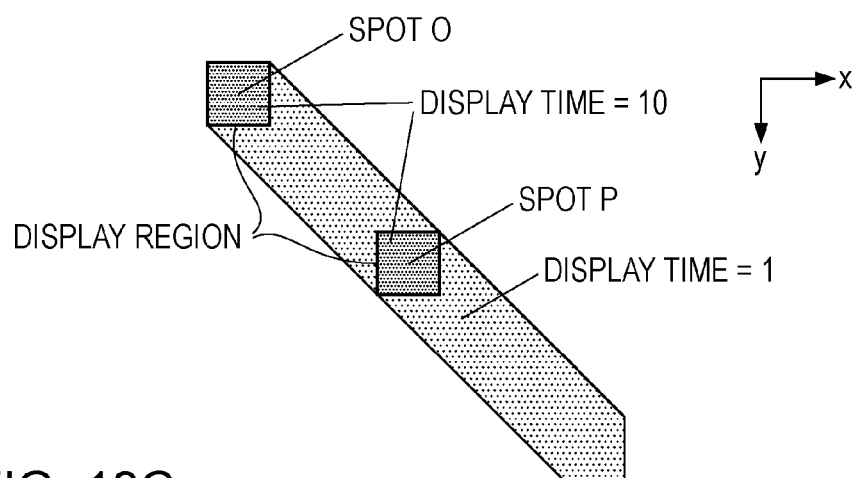
Figure 18C:
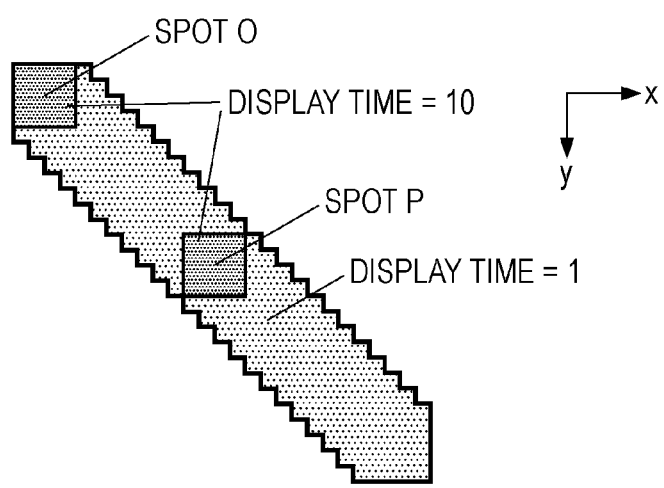

FIGS. 18A to 18C are diagrams illustrating another method of calculating the display time by the storage managing unit 22 (the display time acquiring unit 41 of the storage managing unit 22).

In FIGS. 18A to 18C, the horizontal axes represent the x coordinate (the x axis which is the horizontal direction) of the stored image and the vertical axis represents the y coordinate (the y axis which is the vertical axis) of the stored image.

FIG. 18A shows a case where the display region is moved.

In FIG. 18A, the display region stops at a spot O for time 10, and then is moved obliquely in a right lower direction. Then, the display region stops at a spot P only for time 10, and then is moved again up to a spot Q obliquely in the right.

In FIG. 18A, a shadowed rectangle indicates a display region displayed only for time 10 and an unshadowed rectangle indicates a display region displayed on time (minimum unit) 1.

FIGS. 18B and 18C show the display time of each unit region when the display region on the stored image is moved as in FIG. 18A.

The storage managing unit 22 calculates the display time of the unit region for each unit region of the stored image by integrating the display times of the display regions for the unit regions included in the display region (at least a part of the display region).

In FIGS. 18B and 18C, a darkly shadowed portion indicates a unit region in which the display time is long and a lightly shadowed portion indicates a unit region in which the display time is short.

In FIG. 18B, the unit region is configured as a sufficiently small region compared to the display region such as 1×1 pixel, and thus the display time is calculated for the unit region of which the entirety is included in the display region.

In FIG. 18C, the unit region is configured to have, for example, a size which is not a fraction of an integer of the display region, and thus the display time is calculated for not only the unit region of which the entirety is included in the display region but also the unit region of which a part is included in the display region.

Figure 19A:
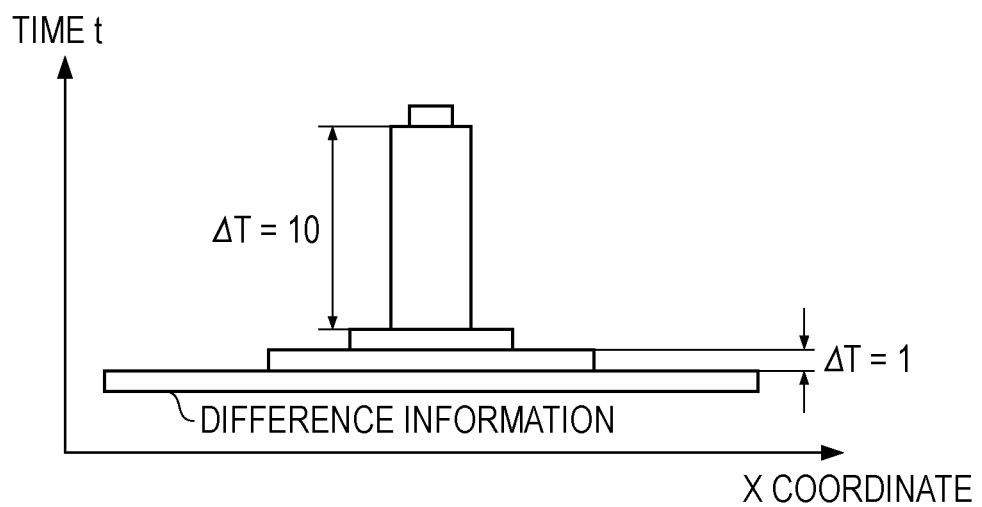
FIGS. 19A and 19B are diagrams illustrating a method of calculating the display time.
Figure 19B:
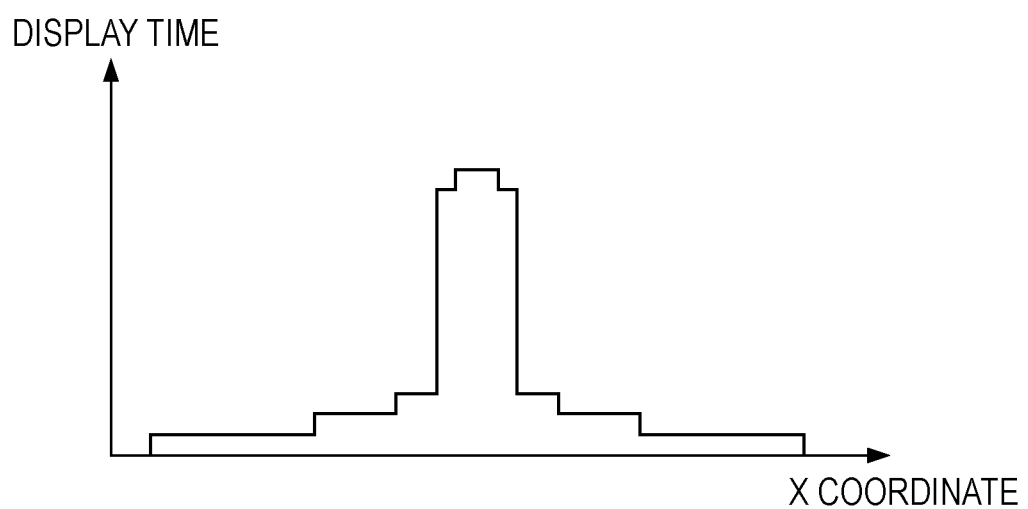

FIGS. 19A and 19B are diagrams illustrating still another method of calculating the display time by the storage managing unit 22 (the display time acquiring unit 41 of the storage managing unit 22).

FIG. 19A is the same diagram as that of FIG. 17A.

That is, a rectangle in FIG. 19A indicates one piece of difference information [$\Delta X$, $\Delta Y$, $\Delta Z$, $\Delta S$, $\Delta T$].

In FIG. 19A, the horizontal axis represents the x coordinates (the x axis which is the horizontal axis) (which is also the x coordinate X of the operation data [X, Y, Z, S, T]) of the stored image and the vertical axis represents a time t.

In FIG. 19A, the rectangle indicating the difference information [$\Delta X$, $\Delta Y$, $\Delta Z$, $\Delta S$, $\Delta T$] is illustrated at a position corresponding to the coordinate X and the operation time T of the operation data [X, Y, Z, S, T] used (immediately previously used) to calculate the difference information [ΔX, ΔY, ΔZ, ΔS, ΔT].

FIG. 19A shows the difference information when the scale S of the display region is decreased without change in the position of the display region on the stored image, that is, the image displayed on the image display apparatus 13 is expanded.

FIG. 19B shows the display time of each unit region when the scale S of the display region on the stored image is small as in FIG. 19A.

In FIG. 19B, the horizontal axis represents the x coordinate of the unit region and the vertical axis represents the display time of the unit region.

The display time of each unit region can be calculated by integrating the time ΔT of the rectangle in the vertical direction, which indicates the difference information [ΔX, ΔY, ΔZ, ΔS, ΔT], in the vertical direction in FIG. 19A.

Description of Computer to which Present Technology is Applied

The above-described series of processes may be executed by hardware or software. When the series of processes are executed by software, a program of the software is installed in a general computer or the like.

Figure 20:
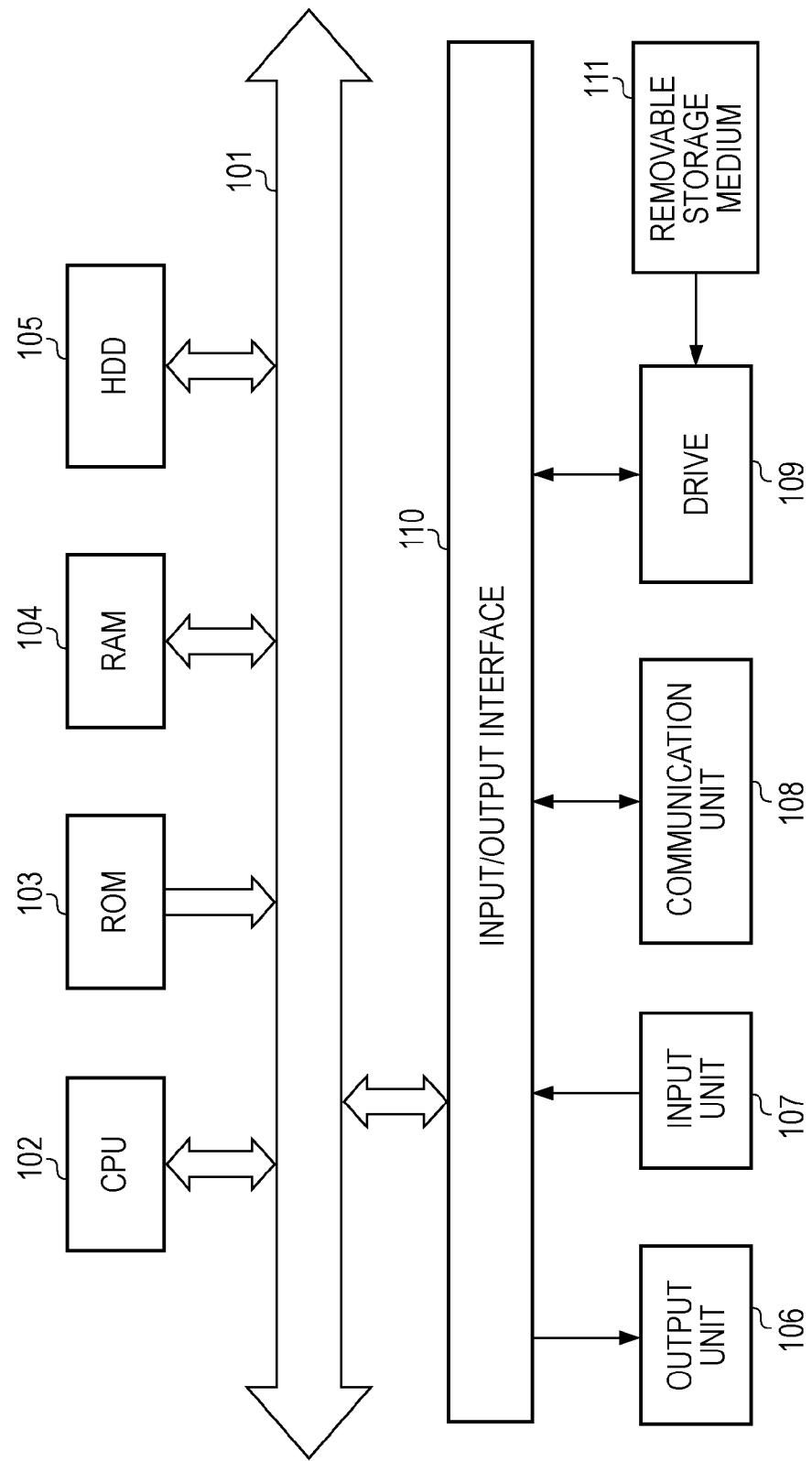
FIG. 20 is a block diagram illustrating an example of the configuration of a computer according to an embodiment of the present technology.

FIG. 20 is a diagram illustrating an example of the configuration of a computer, in which the program executing the above-described series of processes is installed, according to an embodiment.

The program may be recorded in advance in a hard disk 105 or a ROM 103 which is a recording medium and is included in the computer.

Alternatively, the program may be stored (recorded) in a removable recording medium 111. The removable recording medium 111 can be supplied as so-called package software. Here, examples of the removable recording medium 111 include a flexible disk, a CD-ROM (Compact Disc Read Only Memory), an MO (Magneto Optical) disk, a DVD (Digital Versatile Disc), a magnetic disk, and a semiconductor memory.

The program may be installed in the computer from the above-described removable recording medium 111 and may also be downloaded in the computer via a communication network or a broadcast network to be installed in the internal hard disk 105. That is, for example, the program may be transmitted from a download site to the computer in a wireless way via a broadcast satellite for digital broadcasting or may be transmitted from the download site to the computer in a wired way via a network such as a LAN (Local Area Network) or the Internet.

The computer has a CPU (Central Processing Unit) 102 therein. An input/output interface 110 is connected to the CPU 102 via a bus 101.

When the user inputs an instruction by operating an input unit 107 via the input/output interface 110, the CPU 102 executes the program stored in the ROM (Read Only Memory) 103 in response to the instruction. Alternatively, the CPU 102 loads and executes the program stored in the hard disk 105 to a RAM (Random Access Memory) 104.

In this way, the CPU 102 executes the processes of the above-described flowcharts or the processes executed by the units having the configuration of the above-described block diagrams. Then, for example, the CPU 102 outputs the processing result from an output unit 106 via the input/output interface 110, as necessary or transmits the processing result from a communication unit 108, and then records the processing result in the hard disk 105 or the like.

The input unit 107 is configured by, for example, a keyboard, a mouse, or a microphone. The output unit 106 is configured by, for example, an LCD (Liquid Crystal Display) or a speaker.

In the specification, the processes executed in accordance with the program by the computer may not necessarily be in the order described in the flowcharts chronologically. That is, the processes executed in accordance with the program by the computer include processes (for example, processes executed in parallel or processes executed by an object) executed in parallel or individually.

The program may be executed by a single computer (processor) or may be executed in a distribution way by a plurality of computers. Further, the program may be transmitted and executed in a computer located in a remote place.

Embodiments of the present technology are not limited to the above-described embodiments, but may be modified in various forms without the scope of the present technology without departing from the gist of the present technology.

That is, in the above-described embodiment, an image obtained by photographing a sample of a pathological tissue with a microscope has been used as the stored image. However, the stored image is not limited to the image obtained by photographing the sample of the pathological tissue with the microscope.

The embodiments of the present technology are particularly useful for the stored image with the large amount of data.

The present disclosure contains subject matter related to that disclosed in Japanese Priority Patent Application JP 2011-047797 filed in the Japan Patent Office on Mar. 4, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising at least one processor configured to:
    acquire a display time for each unit region of a plurality of unit regions of an image, wherein the display time is acquired based on an operation history generated based on input received when a user browses the image displayed on an image display apparatus; and
    control compression of the image for each unit region of the plurality of unit regions based on the display time.

2. The information processing apparatus according to claim 1, wherein:
    the at least one processor is configured to control the compression of the image such that a compression ratio is lower in a unit region in which the display time is longer.

3. The information processing apparatus according to claim 1, wherein:
    the at least one processor is configured to control the compression of the image such that the compression ratio is higher in a unit region in which an elapsed time is longer after the user browses the image.

4. The information processing apparatus according to claim 3, wherein the image is compressed after a predetermined time is elapsed after the user browses the image.

5. The information processing apparatus according to claim 1, wherein the at least one processor is further configured to:
    calculate an importance level indicating an importance of each unit region; and control the compression of the image based on the importance level.

6. The information processing apparatus according to claim 5, wherein the at least one processor is configured to:
   calculate the importance level so that the importance level is higher in a unit region in which the display time is longer; and
   control the compression of the image such that the compression ratio is lower in a region in which the importance level is higher.

7. The information processing apparatus according to claim 6, wherein the at least one processor is configured to calculate the importance level so that the importance level is higher in a mark region which is a unit region displayed on the image display apparatus when user input indicating a mark is received.

8. The information processing apparatus according to claim 7, wherein:
   when the user input indicating the mark is received with respect to an image with one magnification among images with a plurality of magnifications obtained by photographing the same subject at the plurality of magnifications as the image displayed on the image display apparatus, the at least one processor is configured to calculate the importance level so that the importance level is higher for the mark region of the image with the one magnification and regions, which correspond to the mark region, of the images with the other magnifications.

9. The information processing apparatus according to claim 6, wherein:
   when images with a plurality of magnifications obtained by photographing the same subject at the plurality of magnifications are present as the image displayed on the image display apparatus, the compression control unit calculates the importance level so that the importance level is lower for an image with a higher magnification.

10. The information processing apparatus according to claim 1, wherein the at least one processor is further configured to control a compression parameter.

11. The information processing apparatus according to claim 10, wherein:
    the image is compressed through at least a quantization process, and
    the at least one processor is configured to control a quantization step when the quantization process is executed.

12. The information processing apparatus according to claim 1, wherein the image is compressed by being deleted in a unit of the unit region.

13. An information processing method comprising:
    with at least one processor:
        acquiring a display time for each unit region of a plurality of unit regions of an image, wherein the display time is acquired based on an operation history generated based on input received when a user browses the image displayed on an image display apparatus; and
        controlling compression of the image for each unit region of the plurality of unit regions based on the display time.

14. A computer-readable device storing computer-executable instructions that, when executed by a computer, cause the computer to:
    acquire a display time for each unit region of a plurality of unit regions of an image, wherein the display time is acquired based on an operation history generated based on input received when a user browses the image displayed on an image display apparatus; and
    control compression of the image for each unit region of the plurality of unit regions based on the display time.

* * * * *